US010634262B2

(12) United States Patent
Matsuzaki et al.

(10) Patent No.: US 10,634,262 B2
(45) Date of Patent: Apr. 28, 2020

(54) REFRIGERATION CYCLE DEVICE AND THREE-WAY FLOW RATE CONTROL VALVE

(71) Applicant: Samsung Electronics Co., Ltd, Suwon-si (KR)

(72) Inventors: Takashi Matsuzaki, Kanagawa (JP); Makoto Kobayashi, Kanagawa (JP); Kazuo Shimizu, Kanagawa (JP); Tatsuya Shimizu, Kanagawa (JP); Toshiaki Suzuki, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 15/955,489

(22) Filed: Apr. 17, 2018

(65) Prior Publication Data

US 2018/0299024 A1    Oct. 18, 2018

(30) Foreign Application Priority Data

Apr. 17, 2017  (JP) .................................. 2017-081566
Nov. 6, 2017   (JP) .................................. 2017-214014
(Continued)

(51) Int. Cl.
*F16K 31/04*      (2006.01)
*F16K 11/048*     (2006.01)
(Continued)

(52) U.S. Cl.
CPC .......... *F16K 31/047* (2013.01); *F16K 11/048* (2013.01); *F16K 11/074* (2013.01);
(Continued)

(58) Field of Classification Search
CPC .... F16K 31/047; F16K 11/048; F16K 31/041; F16K 11/074; F16K 31/535; F25D 13/04;
(Continued)

(56) References Cited

U.S. PATENT DOCUMENTS 6,360,552 B1 *   3/2002  Lee ........................... F25B 5/02
                                                             62/200
2012/0047924 A1 *  3/2012  Li ............................ F25B 5/02
                                                             62/113

FOREIGN PATENT DOCUMENTS

JP           4021209 B2     12/2007
JP        2012-007781 A      1/2012
(Continued)

OTHER PUBLICATIONS

International Search Report dated Aug. 6, 2018 in connection with International Patent Application No. PCT/KR2018/004372.

*Primary Examiner* — Emmanuel E Duke

(57) ABSTRACT

Disclosed herein are a refrigeration cycle device and three-way flow rate control valve. In a refrigeration cycle device including a compressor, first and second coolers configured to cool first and second storage compartments at least, respectively, and a mixer configured to mix refrigerants that have passed through the first and second coolers, a refrigerant flow path is switched so that refrigerants of first and second flow rates are circulated to the first and second coolers, respectively, while the first and second storage compartments are being cooled, and a refrigerant flow path is switched so that a refrigerant of a specific flow rate, which is smaller than a first flow rate but is not zero, is circulated to the first cooler after cooling of the first storage compartment is completed.

20 Claims, 28 Drawing Sheets

(30) Foreign Application Priority Data

Feb. 15, 2018 (JP) .................................. 2018-024893
Mar. 26, 2018 (KR) ......................... 10-2018-0034200

(51) Int. Cl.

| | |
|---|---|
| *F25B 41/06* | (2006.01) |
| *F25D 13/04* | (2006.01) |
| *F25B 41/00* | (2006.01) |
| *F16K 11/074* | (2006.01) |
| *F16K 31/53* | (2006.01) |
| *F25D 11/02* | (2006.01) |
| *F25B 5/02* | (2006.01) |

(52) U.S. Cl.
CPC .......... *F16K 31/041* (2013.01); *F16K 31/535* (2013.01); *F25B 41/00* (2013.01); *F25B 41/067* (2013.01); *F25D 11/022* (2013.01); *F25D 13/04* (2013.01); *F25B 5/02* (2013.01); *F25B 2309/004* (2013.01); *F25B 2341/0011* (2013.01); *F25B 2600/2511* (2013.01)

(58) Field of Classification Search
CPC ........ F25D 11/022; F25D 29/00; F25D 21/06; F25B 2341/0011; F25B 41/067; F25B 5/02; F25B 29/003; F25B 1/06; F25B 49/02; F25B 5/00; F25B 5/04; F25B 2600/2511; F25B 2309/004; F25B 41/00
See application file for complete search history.

(56) References Cited

FOREIGN PATENT DOCUMENTS

| | | | | |
|---|---|---|---|---|
| JP | 2013-036621 A | | 2/2013 | |
| JP | 2013-200057 A | | 10/2013 | |
| JP | 2013200057 A | * | 10/2013 | ............... A47F 3/04 |
| JP | 2014190587 A | | 10/2014 | |
| JP | 2016061472 A | | 4/2016 | |
| KR | 10-2001-0037714 A | | 5/2001 | |

* cited by examiner

FIG. 15

| TRANSITION STATE MODE NUMBER | LOWER LIMIT TEMPERATURE VALUE | UPPER LIMIT TEMPERATURE VALUE | TIME VALUE | DUTY RATIO |
|---|---|---|---|---|
| ⋮ | ⋮ | ⋮ | ⋮ | ⋮ |
| 2 | Temp_L[2] | Temp_H[2] | Time[2] | Duty[2] |
| 1 | Temp_L[1] | Temp_H[1] | Time[1] | Duty[1] |
| 0 | Temp_L[0] | Temp_H[0] | Time[0] | Duty[0] |
| -1 | Temp_L[-1] | Temp_H[-1] | Time[-1] | Duty[-1] |
| -2 | Temp_L[-2] | Temp_H[-2] | Time[-2] | Duty[-2] |
| ⋮ | ⋮ | ⋮ | ⋮ | ⋮ |

REFRIGERATION CYCLE DEVICE AND THREE-WAY FLOW RATE CONTROL VALVE

CROSS-REFERENCE TO RELATED APPLICATION(S) AND CLAIM OF PRIORITY

This application is based on and claims priority under 35 U.S.C. § 119 to Japanese Patent Application Nos. 2017-081566 filed on Apr. 17, 2017, 2017-214014 filed on Nov. 6, 2017, and 2018-024893 filed on Feb. 15, 2018, in the Japan Patent Office and Korean Patent Application No. 10-2018-0034200 filed on Mar. 26, 2018 in the Korean Intellectual Property Office, the disclosures of which are incorporated herein by reference in their entireties.

BACKGROUND

1. Field

Embodiments of the present disclosure relate to a refrigeration cycle device and three-way flow rate control valve.

2. Description of the Related Art

There is known a refrigeration cycle device including a first cooling space, a second cooling space at a lower temperature than the first cooling space, a compressor, a condenser, a high-temperature-side switcher connected to the condenser, first and second expansion devices arranged in parallel through the high-temperature-side switcher, a first evaporator configured to cool the first cooling space, a second evaporator configured to cool the second cooling space, and an ejector having an inlet connected to the first evaporator, a suction hole connected to the second evaporator, and an outlet connected to the compressor, wherein, by switching of the high-temperature-side switcher, the refrigeration cycle device has a first cooling mode in which a refrigerant is distributed to the first evaporator and a refrigerant distribution to the second evaporator is stopped, a second cooling mode in which a refrigerant is distributed to the second evaporator and a refrigerant distribution to the first evaporator is stopped, and a simultaneous cooling mode in which a refrigerant is distributed to both the first evaporator and the second evaporator (for example, see Patent Document 1).

There is also known an ejector-type refrigeration cycle device including a pressure sensor installed at a refrigerant outlet of an evaporator, a temperature sensor installed at the refrigerant outlet of the evaporator, and a control device in which a pressure and a temperature respectively detected by the pressure sensor and the temperature sensor are input, wherein saturated vapor data is registered to the control device, the detected pressure is matched to the saturated vapor data to calculate saturation temperature, a difference between the saturation temperature and the temperature detected by the temperature sensor is calculated as the degree of superheat, the calculated degree of superheat is compared with a preset degree of superheat, and an expansion valve is opened or closed in accordance with the difference (for example, see Patent Document 2).

Patent Document 1: Japanese Unexamined Patent Application, Publication No. 2016-61472

Patent Document 2: Japanese Unexamined Patent Application, Publication No. 2014-190587

SUMMARY

When, in a state in which two storage compartments are being cooled, cooling of one of the storage compartments is suppressed, an effect of a mixer cannot be maintained when a refrigerant mixed in the mixer is not circulated at all to a cooler configured to cool at least the one of the storage compartments, and the amount of refrigerant becomes excessive when all of the refrigerant is circulated to a cooler configured to cool at least the other storage compartment. As a result, energy efficiency cannot be achieved.

When, in a state in which two storage compartments are being cooled, a ratio between a flow rate of refrigerant flowing to a cooler configured to cool at least one of the storage compartments and a flow rate of refrigerant flowing to a cooler configured to cool at least the other storage compartment is changed in accordance with a temperature change during cooling, an effect of a mixer is reduced. As a result, energy efficiency cannot be achieved.

When, in a state in which two storage compartments are being cooled, cooling of one of the storage compartments is suppressed, embodiments disclosed herein prevent the case in which an effect of a mixer cannot be maintained due to a refrigerant mixed in the mixer not being circulated at all to a cooler configured to cool at least the one of the storage compartments, or the case in which the amount of refrigerant becomes excessive due to all of the refrigerant being circulated to a cooler configured to cool at least the other storage compartment, thereby achieving energy efficiency.

When, in a state in which two storage compartments are being cooled, embodiments disclosed herein prevent the case in which an effect of a mixer cannot be demonstrated due to a ratio between a flow rate of refrigerant flowing to a cooler configured to cool at least one of the storage compartments and a flow rate of refrigerant flowing to a cooler configured to cool at least the other storage compartment being changed in accordance with a temperature change during cooling, thereby achieving energy efficiency.

Additional aspects of the present disclosure will be set forth in part in the description which follows and, in part, will be obvious from the description, or may be learned by practice of the disclosure.

In accordance with one aspect of the present disclosure, a refrigeration cycle device includes a compressor configured to circulate a refrigerant, a first cooler configured to cool at least a first storage compartment with the refrigerant circulated by the compressor, a second cooler configured to cool at least a second storage compartment with the refrigerant circulated by the compressor, a mixer configured to mix a refrigerant that has passed through the first cooler and a refrigerant that has passed through the second cooler and supply the mixed refrigerant to the compressor, and a switcher configured to switch a refrigerant flow path to control a refrigerant flow rate so that, when cooling the first storage compartment or the second storage compartment, a refrigerant is circulated to both the first cooler and the second cooler at all times.

Here, the refrigeration cycle device may include a first throttler configured to throttle and expand an amount of refrigerant flowing to the first cooler and a second throttler configured to throttle and expand an amount of refrigerant flowing to the second cooler. Refrigerant flow rate control may be performed by changing a refrigerant flow path that is controlled by the relationship between a refrigerant flow path resistance in the mixer and a flow path resistance of the first throttler and the second throttler.

The switcher may switch a refrigerant flow path so that, while the first storage compartment and the second storage compartment are being cooled, a refrigerant of a first flow rate is circulated to the first cooler and a refrigerant of a second flow rate is circulated to the second cooler, and may switch a refrigerant flow path so that, even after cooling of the first storage compartment is suppressed, a refrigerant of a specific flow rate, which is smaller than the first flow rate but is not zero, is circulated to the first cooler.

The mixer may be an ejector that sets the refrigerant that has passed through the first cooler as a driving flow, sets the refrigerant that has passed through the second cooler as a suction flow, and is configured to mix the driving flow and the suction flow and supply the mixed flow to the compressor.

The first cooler may cool the first storage compartment, and the second cooler may cool the second storage compartment, which is in a temperature range different from that of the first storage compartment.

The switcher may determine the first flow rate and the second flow rate on the basis of a difference between actual temperatures and target temperatures of the first storage compartment and the second storage compartment.

In accordance with another aspect of the present disclosure, there is provided a refrigeration cycle device including a compressor configured to circulate a refrigerant, a first cooler configured to cool at least a first storage compartment with the refrigerant circulated by the compressor, a second cooler configured to cool at least a second storage compartment with the refrigerant circulated by the compressor, a mixer configured to mix a refrigerant that has passed through the first cooler and a refrigerant that has passed through the second cooler and supply the mixed refrigerant to the compressor, and a switcher configured to switch a refrigerant flow path so that, while the first storage compartment and the second storage compartment are being cooled, a refrigerant of a first flow rate is circulated to the first cooler and a refrigerant of a second flow rate is circulated to the second cooler, and switch a refrigerant flow path so that, after cooling of the first storage compartment is suppressed, a refrigerant of a specific flow rate, which is smaller than a sum of the first flow rate and the second flow rate, is circulated only to the second cooler.

Here, after cooling of the first storage compartment is suppressed, the switcher may flow a refrigerant only to the second cooler for a time corresponding to a specific flow rate.

The switcher may also determine the first flow rate and the second flow rate so that a state in which a refrigeration capacity of the first cooler is higher than a refrigeration capacity of the second cooler and a state in which the refrigeration capacity of the second cooler is higher than the refrigeration capacity of the first cooler are realized. In this case, the switcher may be controlled with time, or may be controlled by a temperature sensor inside the first storage compartment or a temperature sensor inside the second storage compartment.

Further, the switcher may also determine the first flow rate and the second flow rate so that the refrigeration capacity of the first cooler becomes higher than the refrigeration capacity of the second cooler, and the second flow rate is decreased to an extent that the second flow rate does not increase temperature of a refrigeration compartment.

In accordance with still another aspect of the present disclosure, there is provided a refrigeration cycle device including a compressor configured to circulate a refrigerant, a first cooler configured to cool at least a first storage compartment with the refrigerant circulated by the compressor, a second cooler configured to cool at least a second storage compartment with the refrigerant circulated by the compressor, a mixer configured to mix a refrigerant that has passed through the first cooler and a refrigerant that has passed through the second cooler and supply the mixed refrigerant to the compressor, a temperature sensor configured to sense temperature of at least one of the first cooler and the second cooler, and a switcher configured to switch a refrigerant flow path so that, while the first storage compartment and the second storage compartment are being cooled, a ratio between a flow rate of refrigerant flowing along a flow path to the first cooler and a flow rate of refrigerant flowing along a flow path to the second cooler is changed in accordance with temperature sensed by the temperature sensor.

In accordance with yet another aspect of the present disclosure, there is provided a refrigeration cycle device including a compressor configured to circulate a refrigerant, a first cooler configured to cool at least a first storage compartment with the refrigerant circulated by the compressor, a second cooler configured to cool at least a second storage compartment with the refrigerant circulated by the compressor, a mixer configured to mix a refrigerant that has passed through the first cooler and a refrigerant that has passed through the second cooler and supply the mixed refrigerant to the compressor, and a switcher configured to switch a refrigerant flow path so that, while the first storage compartment and the second storage compartment are being cooled, a ratio between a flow rate of refrigerant flowing along a flow path to the first cooler and a flow rate of refrigerant flowing along a flow path to the second cooler is changed in accordance with time that has elapsed after cooling has been started.

Here, the switcher may switch a refrigerant flow path so that, while the first storage compartment and the second storage compartment are being cooled, the ratio between the flow rate of refrigerant flowing to the flow path to the first cooler and the flow rate of refrigerant flowing to the flow path to the second cooler is changed in accordance with a number of rotations of the compressor.

The switcher may change the ratio between the flow rate of refrigerant flowing to the flow path to the first cooler and the flow rate of refrigerant flowing to the flow path to the second cooler so that a ratio between a flow rate of refrigerant flowing to the first cooler and a flow rate of refrigerant flowing to the second cooler is close to a predetermined ratio.

The mixer may be an ejector that sets the refrigerant that has passed through the first cooler as a driving flow, sets the refrigerant that has passed through the second cooler as a suction flow, and is configured to mix the driving flow and the suction flow and supply the mixed flow to the compressor.

The switcher may switch a refrigerant flow path so that, while the first storage compartment and the second storage compartment are being cooled, the refrigerant is circulated to the first cooler and the second cooler with a time ratio in accordance with a flow rate ratio between the first flow rate and the second flow rate.

The refrigeration cycle device may further include a first throttler configured to throttle and expand the amount of refrigerant circulated by the switcher and supply the refrigerant to the first cooler, and a second throttler configured to throttle and expand the amount of refrigerant circulated by the switcher and supply the refrigerant to the second cooler.

The switcher may include an opening degree adjusting mechanism configured to throttle and expand the amount of refrigerant circulated by the compressor.

The refrigeration cycle device may further include a first gas-liquid separator configured to exclude liquid refrigerant from the refrigerant that has passed through the first cooler and supply a gaseous single-phase refrigerant to the mixer, and a second gas-liquid separator configured to exclude liquid refrigerant from the refrigerant that has passed through the second cooler and supply a gaseous single-phase refrigerant to the mixer.

The first cooler may vaporize the liquid refrigerant from the refrigerant and supply the gaseous single-phase refrigerant to the mixer and the second cooler may vaporize the liquid refrigerant from the refrigerant and supply the gaseous single-phase refrigerant to the mixer.

The refrigeration cycle device may further include a first heat exchanger configured to perform a heat exchange between a high-temperature refrigerant that has passed through a condenser configured to condense the refrigerant circulated by the compressor and a low-temperature refrigerant that has passed through the first cooler but has not yet passed through the mixer.

The refrigeration cycle device may further include a second heat exchanger configured to perform a heat exchange between a high-temperature refrigerant that has passed through a condenser configured to condense the refrigerant circulated by the compressor and a low-temperature refrigerant that has passed through the second cooler but has not yet passed through the mixer.

In accordance with yet another aspect of the present disclosure, there is provided a method of controlling a refrigeration cycle device including a compressor configured to circulate a refrigerant, a first cooler configured to cool at least a first storage compartment with the refrigerant circulated by the compressor, a second cooler configured to cool at least a second storage compartment with the refrigerant circulated by the compressor, and a mixer configured to mix a refrigerant that has passed through the first cooler and a refrigerant that has passed through the second cooler and supply the mixed refrigerant to the compressor, the method including switching a refrigerant flow path so that, while the first storage compartment and the second storage compartment are being cooled, a refrigerant of a first flow rate is circulated to the first cooler and a refrigerant of a second flow rate is circulated to the second cooler, and switching a refrigerant flow path so that, even after cooling of the first storage compartment is suppressed, a refrigerant of a specific flow rate, which is smaller than the first flow rate but is not zero, is circulated to the first cooler.

In accordance with yet another aspect of the present disclosure, there is provided a method of controlling a refrigeration cycle device including a compressor configured to circulate a refrigerant, a first cooler configured to cool at least a first storage compartment with the refrigerant circulated by the compressor, a second cooler configured to cool at least a second storage compartment with the refrigerant circulated by the compressor, and a mixer configured to mix a refrigerant that has passed through the first cooler and a refrigerant that has passed through the second cooler and supply the mixed refrigerant to the compressor, the method including switching a refrigerant flow path so that, while the first storage compartment and the second storage compartment are being cooled, a refrigerant of a first flow rate is circulated to the first cooler and a refrigerant of a second flow rate is circulated to the second cooler, and switching a refrigerant flow path so that, after cooling of the first storage compartment is suppressed, a refrigerant of a specific flow rate, which is smaller than a sum of the first flow rate and the second flow rate, is circulated only to the second cooler.

In accordance with yet another aspect of the present disclosure, there is provided a method of controlling a refrigeration cycle device including a compressor configured to circulate a refrigerant, a first cooler configured to cool at least a first storage compartment with the refrigerant circulated by the compressor, a second cooler configured to cool at least a second storage compartment with the refrigerant circulated by the compressor, and a mixer configured to mix a refrigerant that has passed through the first cooler and a refrigerant that has passed through the second cooler and supply the mixed refrigerant to the compressor, the method including sensing temperature of at least one of the first cooler and the second cooler, and switching a refrigerant flow path so that, while the first storage compartment and the second storage compartment are being cooled, a ratio between a flow rate of refrigerant flowing along a flow path to the first cooler and a flow rate of refrigerant flowing along a flow path to the second cooler is changed in accordance with the sensed temperature.

In accordance with yet another aspect of the present disclosure, there is provided a method of controlling a refrigeration cycle device including a compressor configured to circulate a refrigerant, a first cooler configured to cool at least a first storage compartment with the refrigerant circulated by the compressor, a second cooler configured to cool at least a second storage compartment with the refrigerant circulated by the compressor, and a mixer configured to mix a refrigerant that has passed through the first cooler and a refrigerant that has passed through the second cooler and supply the mixed refrigerant to the compressor, the method including determining time that has elapsed after cooling has been started while the first storage compartment and the second storage compartment are being cooled, and switching a refrigerant flow path so that, while the first storage compartment and the second storage compartment are being cooled, a ratio between a flow rate of refrigerant flowing along a flow path to the first cooler and a flow rate of refrigerant flowing along a flow path to the second cooler is changed in accordance with the determined time.

In accordance with yet another aspect of the present disclosure, there is provided a three-way flow rate control valve including a valve sheet having a first outlet and a second outlet configured to discharge a fluid, and a valve member installed to be rotatable with respect to the valve sheet and configured to adjust an opening degree of each outlet, wherein a fully-open groove that entirely overlaps each outlet and an opening-degree-varying groove, whose area overlapping each outlet is changed due to rotating, are formed in the valve member, and a first flow rate ratio control state in which the fully-open groove overlaps the second outlet while the opening-degree-varying groove overlaps the first outlet and a second flow rate ratio control state in which the fully-open groove overlaps the first outlet while the opening-degree-varying groove overlaps the second outlet are at least set in accordance with an angle of rotation of the valve member.

Here, a first opening-degree-varying groove and a second opening-degree-varying groove, whose areas overlapping each outlet are changed due to rotating, may be formed as the opening-degree-varying groove in the valve member, a state in which the fully-open groove overlaps the second outlet while the first opening-degree-varying groove overlaps the first outlet may be set as the first flow rate ratio control state, and a state in which the fully-open groove overlaps the first outlet while the second opening-degree-varying groove overlaps the second outlet may be set as the second flow rate ratio control state.

In this case, the three-way flow rate control valve may be configured so that a fully-open state in which the fully-open groove entirely overlaps the first outlet and the second outlet is at least further set in accordance with an angle of rotation of the valve member.

The three-way flow rate control valve may be configured so that a fully-closed state in which none of the fully-open groove, the first opening-degree-varying groove, and the second opening-degree-varying groove overlap the first outlet and the second outlet is at least further set in accordance with an angle of rotation of the valve member.

The fluid may be a refrigerant, the first outlet may be connected to a first cooler, the second outlet may be connected to a second cooler, and the three-way flow rate control valve may configure any one of the switchers described above.

Further, the three-way flow rate control valve may be configured so that a first individual flow rate control state in which none of the fully-open groove, the first opening-degree-varying groove, and the second opening-degree-varying groove overlap the second outlet while the second opening-degree-varying groove overlaps the first outlet is at least further set in accordance with an angle of rotation of the valve member. In this case, the fluid may be a refrigerant, the first outlet may be connected to the second cooler, the second outlet may be connected to the first cooler, and the three-way flow rate control valve may configure any one of the switchers described above. Also, the three-way flow rate control valve may be configured so that a second individual flow rate control state in which none of the fully-open groove, the first opening-degree-varying groove, and the second opening-degree-varying groove overlap the first outlet while the second opening-degree-varying groove overlaps the second outlet is at least further set in accordance with an angle of rotation of the valve member.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 15 is a view illustrating an example of a table used in operation of a controller according to an embodiment of the present disclosure;

DETAILED DESCRIPTION

Figure 1:
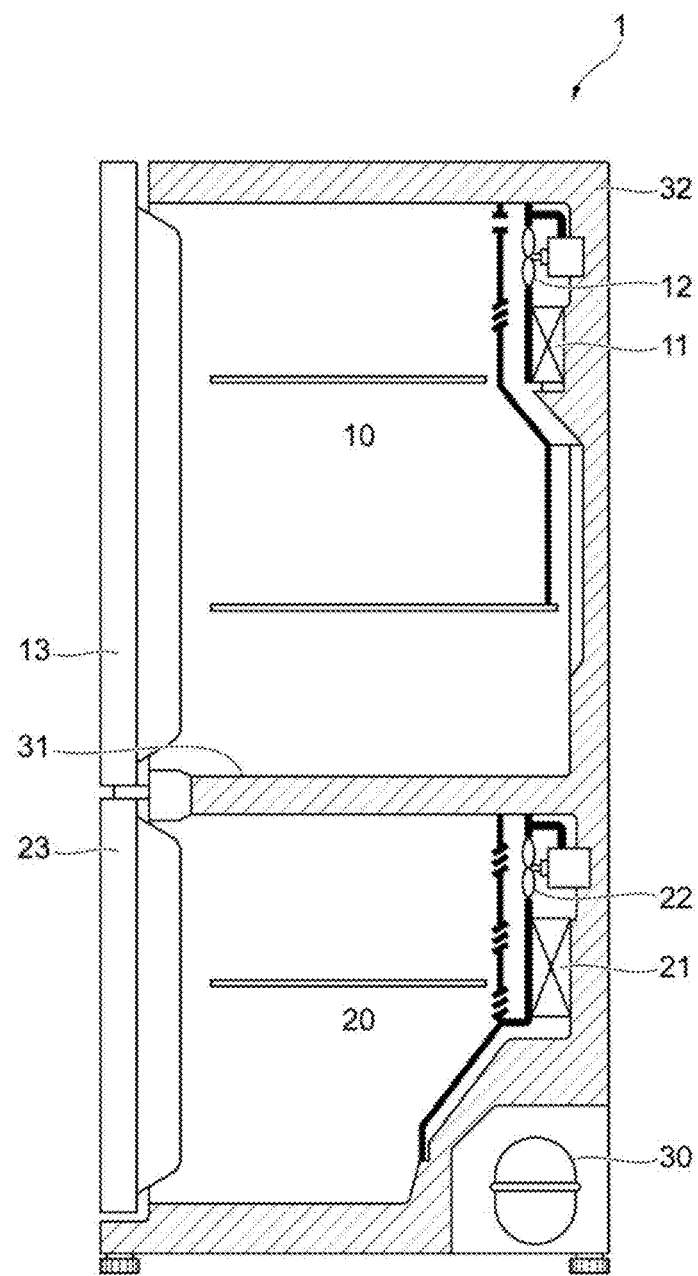
FIG. 1 is a view illustrating an example of the overall configuration of a refrigerator to which an embodiment of the present disclosure is applied.

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like reference numerals refer to like elements throughout. Not all parts of embodiments are described herein, and general content in the art to which the present disclosure pertains or overlapping content between the embodiments will be omitted. The terms "part, module, member, and block" used herein may be implemented with software or hardware, and depending on the embodiment, a plurality of "parts, modules, members, and blocks" may be implemented with a single element, or a single "part, module, member, or block" may include a plurality of elements.

Throughout the specification, when a certain part is described as being "connected" to another part, this includes being connected indirectly as well as being connected directly, and the indirect connection includes being connected via a wireless communication network.

When a certain part is described as "including" a certain element, this means that the part may further include other elements instead of excluding the other elements unless particularly described otherwise.

Terms such as first and second are used to distinguish one element from another element, and the elements are not limited by such terms.

A singular expression includes a plural expression unless there is an obvious exception in the context.

Hereinafter, principles and embodiments of the present disclosure will be described with reference to the accompanying drawings.

FIG. 1 is a view illustrating an example of the overall configuration of a refrigerator 1 to which the present embodiment is applied. As illustrated in FIG. 1, the refrigerator 1 includes a refrigerating compartment 10, which is an example of a first storage compartment formed at an upper portion in the refrigerator, and a freezing compartment 20, which is an example of a second storage compartment formed at a lower portion in the refrigerator. Also, the refrigerator 1 includes a compressor 30 configured to compress and circulate refrigerant. The refrigerating compartment 10 includes a refrigerating evaporator 11 configured to evaporate the refrigerant circulated by the compressor 30 and cool the refrigerating compartment 10, and a refrigerating fan 12 configured to blow air cooled in the refrigerating evaporator 11 into the refrigerating compartment 10. The freezing compartment 20 includes a freezing evaporator 21 configured to evaporate the refrigerant circulated by the compressor 30 and cool the freezing compartment 20, and a freezing fan 22 configured to blow air cooled in the freezing evaporator 21 into the freezing compartment 20. Further, the refrigerator 1 includes a refrigerating compartment door 13 that is opened and closed for food storage or the like in the refrigerating compartment 10, a freezing compartment door 23 that is opened and closed for food storage or the like in the freezing compartment 20, a middle partition 31 configured to partition the refrigerating compartment 10 and the freezing compartment 20 from each other, and a rear wall 32 commonly formed at rear portions across the refrigerating compartment 10 and the freezing compartment 20.

Figure 2:
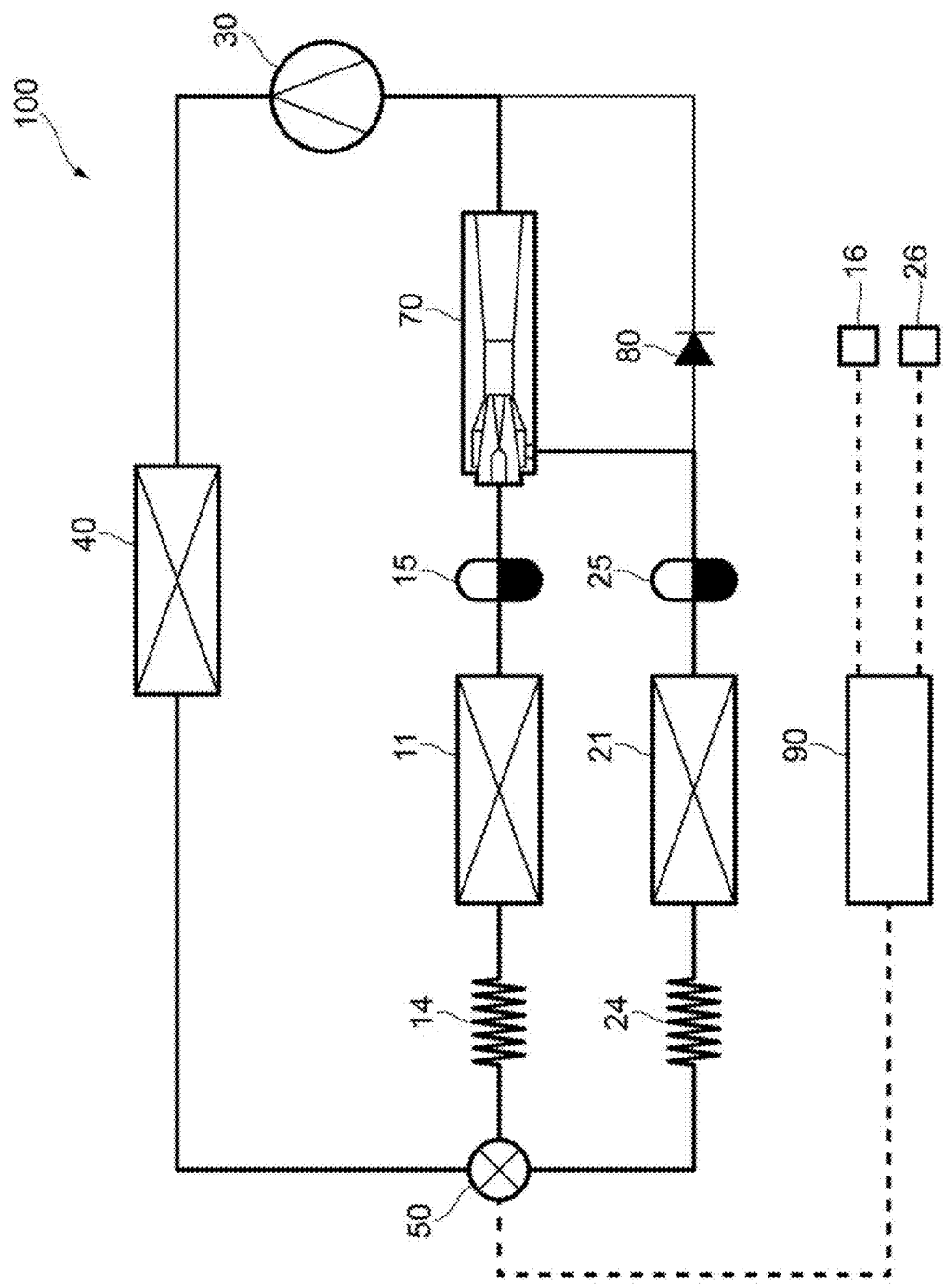
FIG. 2 is a view illustrating a configuration example of a refrigeration cycle according to embodiments of the present disclosure.

FIG. 2 is a view illustrating a configuration of a refrigeration cycle 100, which is an example of a refrigeration cycle according to an embodiment. As illustrated in FIG. 2, the refrigeration cycle 100 includes a compressor 30 configured to circulate refrigerant, and a condenser 40 configured to condense the refrigerant circulated by the compressor 30. Also, a refrigerating evaporator 11, which is an example of a first cooler configured to cool a refrigerating compartment 10, and a freezing evaporator 21, which is an example of a second cooler configured to cool a freezing compartment 20, are connected in parallel in the refrigeration cycle 100. Although the refrigerating evaporator 11 configured to cool the refrigerating compartment 10 and the freezing evaporator 21 configured to cool the freezing compartment 20 are connected in this case, an evaporator configured to cool at least the refrigerating compartment 10 and an evaporator configured to cool at least the freezing compartment 20 may also be connected. Also, a switching valve 50, which is an example of a switcher for switching an evaporator, which is configured to send the refrigerant condensed by the condenser 40 is installed between the refrigerating evaporator 11 and the freezing evaporator 21. A refrigerating capillary tube 14, which is an example of a first throttler configured to throttle and expand an amount of refrigerant introduced into the refrigerating evaporator 11, is connected between an inlet side of the refrigerating evaporator 11 and the switching valve 50 and a freezing capillary tube 24, which is an example of a second throttler configured to throttle and expand an amount of refrigerant introduced into the freezing evaporator 21, is connected between an inlet side of the freezing evaporator 21 and the switching valve 50.

Further, the refrigeration cycle 100 includes an ejector 70, which is an example of a mixer configured to mix a refrigerant flowing out from the refrigerating evaporator 11 and a refrigerant flowing out from the freezing evaporator 21. Here, an outlet side of the refrigerating evaporator 11 is connected to a driving side of the ejector 70, an outlet side of the freezing evaporator 21 is connected to a suctioning side of the ejector 70, and a suctioning side of the compressor 30 is connected to an outlet side of the ejector 70. Also, for a gaseous single-phase refrigerant to flow to the ejector 70, a refrigerating accumulator 15, which is an example of a first gas-liquid separator, is connected to the outlet side of the refrigerating evaporator 11, and a freezing accumulator 25, which is an example of a second gas-liquid separator, is connected to the outlet side of the freezing evaporator 21. In this way, since the ejector 70 is operated only with a gaseous single-phase refrigerant, the size of the ejector 70 may be reduced, and design thereof may be simplified.

Further, although it is not necessarily essential, a check valve 80 configured to bypass the suctioning side and the outlet side of the ejector 70 may be connected. Accordingly, when refrigerant is circulated only toward the freezing evaporator 21, pressure loss from the ejector 70 may be prevented, and energy efficiency may be achieved.

Further, the refrigeration cycle 100 includes a refrigerating temperature sensor 16 configured to sense a temperature of the refrigerating compartment 10, a freezing temperature sensor 26 configured to sense a temperature of the freezing compartment 20, and a controller 90 configured to control switching of the switching valve 50 on the basis of the temperature sensed by the refrigerating temperature sensor 16 and the temperature sensed by the freezing temperature sensor 26.

Figure 3A:
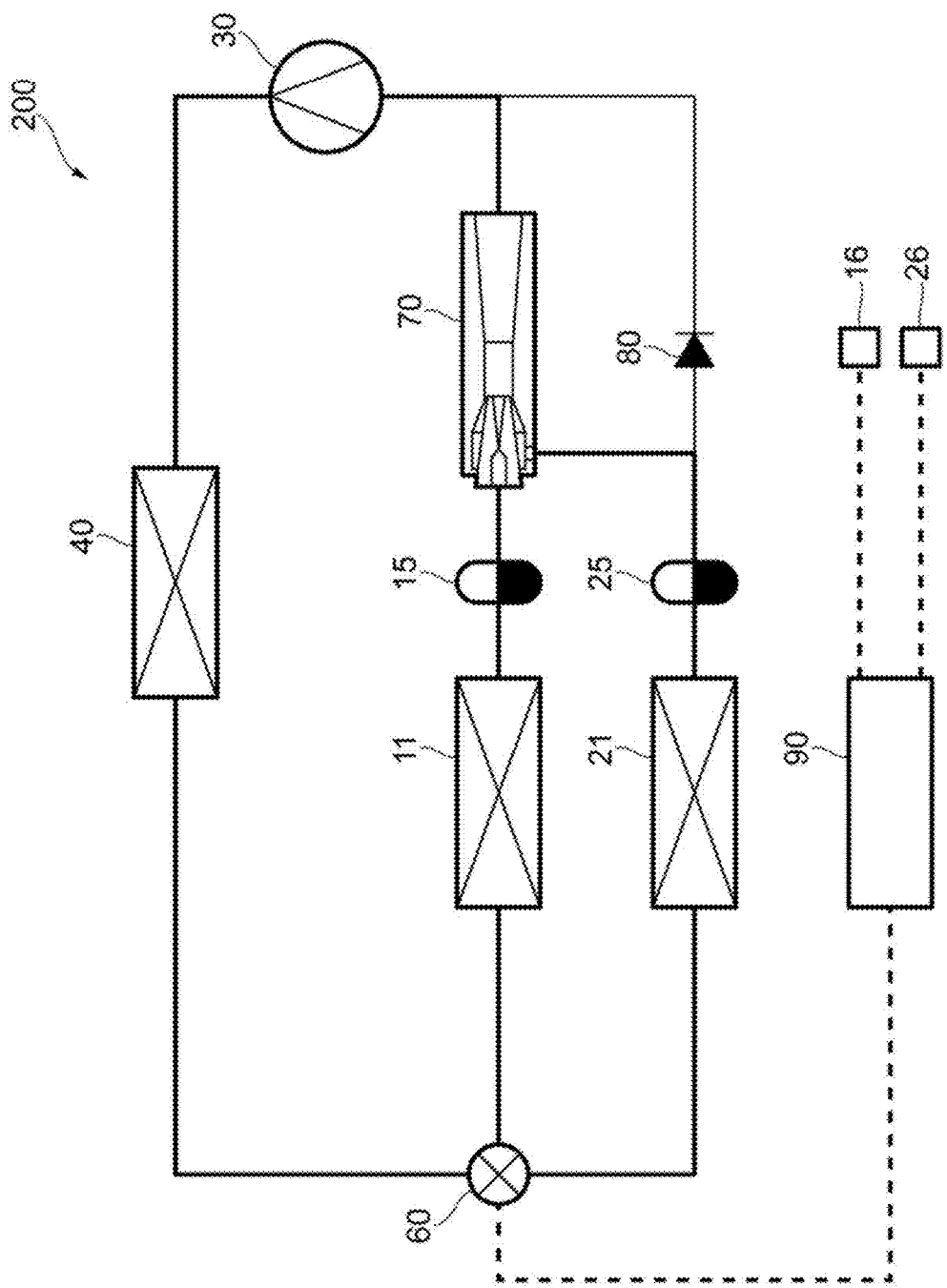
FIG. 3A is a view illustrating a configuration example of a refrigeration cycle according to embodiments of the present disclosure.
Figure 3B:
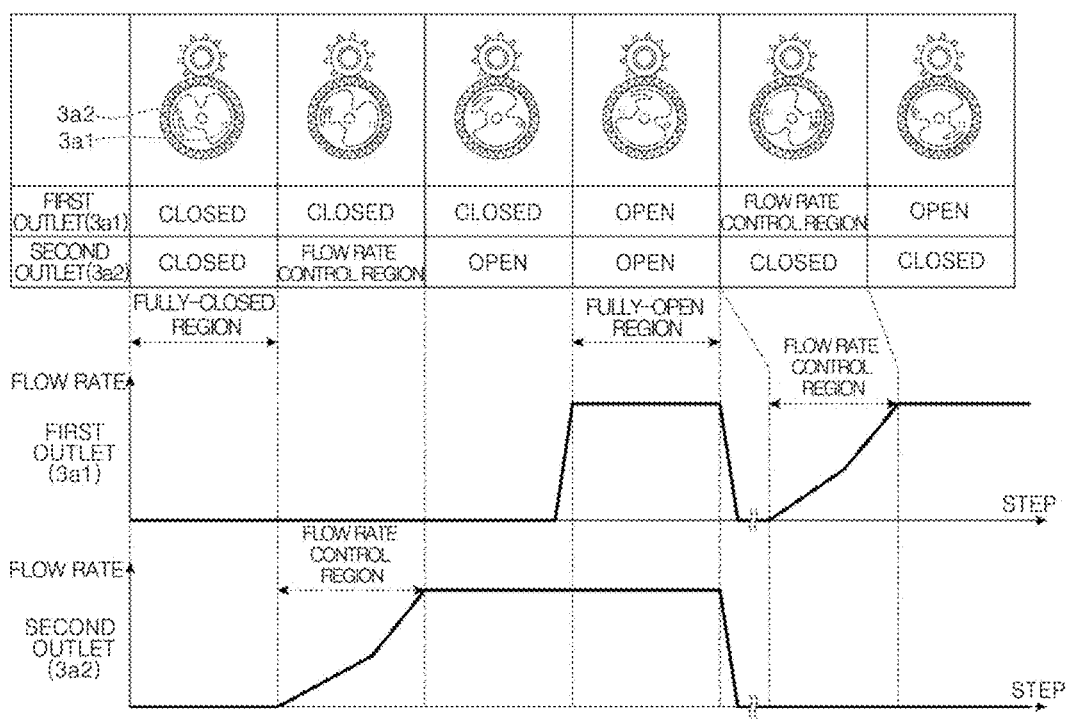
FIG. 3B is a view illustrating operation of a three-way flow rate control valve and a refrigerant flow according to embodiments of the present disclosure.

FIG. 3A is a view illustrating a configuration of a refrigeration cycle 200, which is another example of the refrigeration cycle according to an embodiment. The refrigeration cycle 200 has the same configuration as the refrigeration cycle 100 of FIG. 2 except for substituting the switching valve 50, the refrigerating capillary tube 14, and the freezing capillary tube 24 with a three-way flow rate control valve 60, which is an example of a switcher having an opening degree adjusting mechanism capable of individual flow rate control as illustrated in FIG. 3B, and the controller 90 controlling the three-way flow rate control valve 60 instead of the switching valve 50. Accordingly, switching a refrigerant flow path and throttling and expanding of refrigerant may be simultaneously performed with a single valve, and cost reduction may be achieved.

In the refrigeration cycle 100 of FIG. 2 and the refrigeration cycle 200 of FIG. 3A, the refrigerating accumulator 15 excludes liquid refrigerant from refrigerant that has passed through the refrigerating evaporator 11 and allows a gaseous single-phase refrigerant to flow to the ejector 70, and the freezing accumulator 25 removes liquid refrigerant from refrigerant that has passed through the freezing evaporator 21 and allows a gaseous single-phase refrigerant to flow to the ejector 70, but embodiments are not limited thereto. The refrigerating evaporator 11 may vaporize the liquid refrigerant from the refrigerant and allow a gaseous single-phase refrigerant to flow to the ejector 70, and the freezing evaporator 21 may vaporize the liquid refrigerant from the refrigerant and allow a gaseous single-phase refrigerant to flow to the ejector 70.

Further, although the term "gaseous single-phase refrigerant" has been used for convenience in this case, this does not mean that liquid refrigerant should not be included at all. That is, the "gaseous single-phase refrigerant" may also be understood as a concept encompassing "refrigerant close to gaseous single phase" including a small amount of liquid refrigerant.

However, in an embodiment, in the refrigeration cycle 100 of FIG. 2 or the refrigeration cycle 200 of FIG. 3A, when the amount of refrigerant circulated to the refrigerating evaporator 11 and the freezing evaporator 21 is controlled, and the temperature of the refrigerating compartment 10 has reached target temperature, the amount of refrigerant which would not cause the refrigerating compartment 10 to become excessively cold is circulated to the refrigerating evaporator 11. Accordingly, a predetermined amount or more of the driving flow of the ejector 70 may be secured, and an effect of the ejector 70 may be enhanced.

Figure 4:
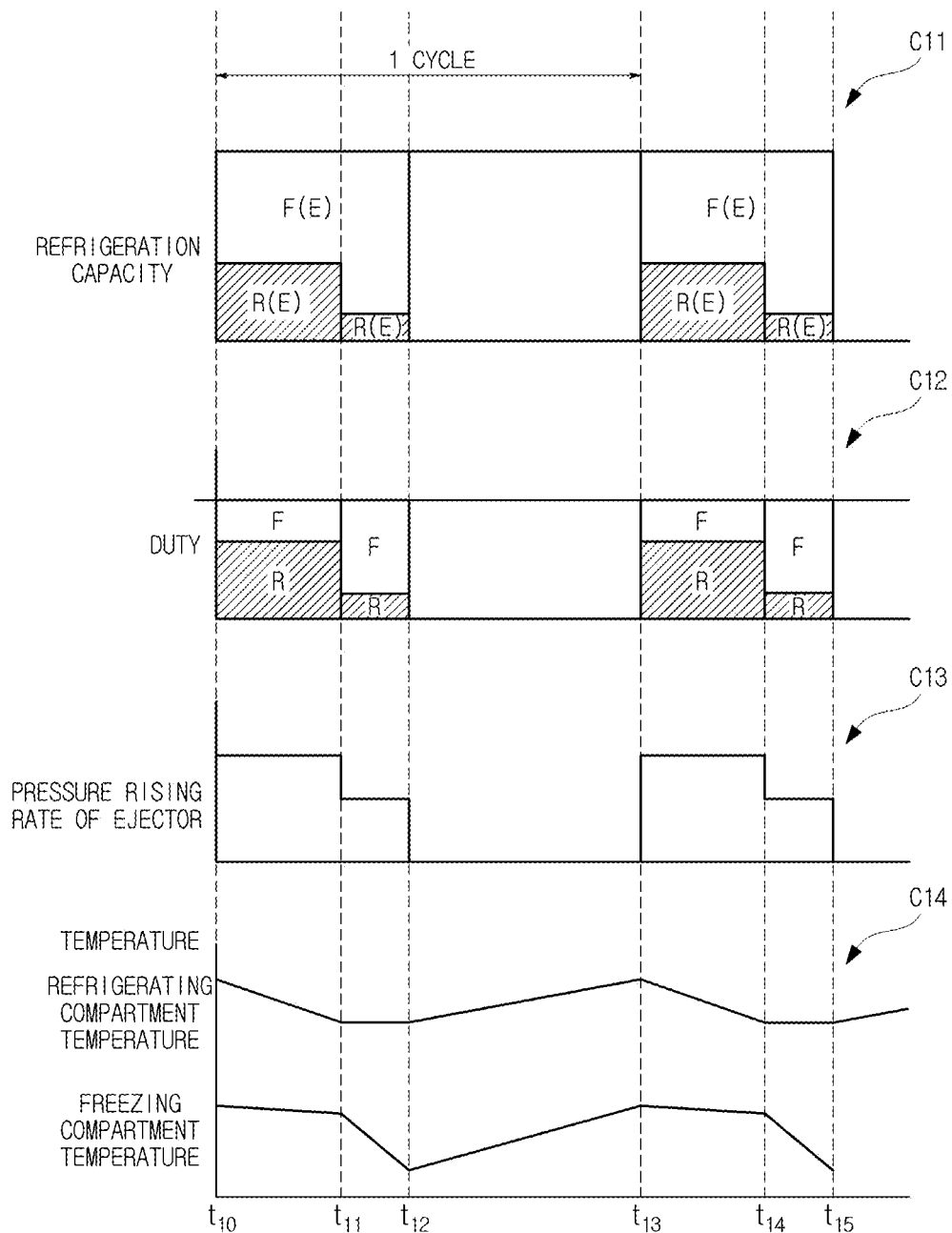
FIG. 4 is a time chart showing operations according to an embodiment of the present disclosure.

FIG. 4 is a time chart showing operations according to an embodiment. A time chart C11 shows a trend of a refrigeration capacity of the refrigerating evaporator 11 (indicated by R(E)) and a refrigeration capacity of the freezing evaporator 21 (indicated by F(E)), a time chart C12 shows a trend of a duty ratio of the refrigerating evaporator 11 (indicated by R) and a duty ratio of the freezing evaporator 21 (indicated by F), a time chart C13 shows a trend of a pressure rising rate of the ejector 70, and a time chart C14 shows a trend of the temperature of the refrigerating compartment 10 and the temperature of the freezing compartment 20.

Here, when a duty control is performed, although an opening degree of each of the refrigerating evaporator 11 and the freezing evaporator 21 is adjusted and a flow rate is adjusted in each duty section, control may also be performed in a fully-closed mode. Even when any one or both of the refrigerating evaporator 11 and the freezing evaporator 21 are fully closed, an evaporator at the fully-closed side may also secure refrigeration capacity for a predetermined period with refrigerant remaining in the capillary tubes 14 and 24 or in each evaporator. As an example, this may also be applied to a case in which the switching valve 50 only has a one-side flowing mode.

In an embodiment, by controlling the switching valve 50 of FIG. 2 or the three-way flow rate control valve 60 of FIG. 3A, as illustrated in t10 to t11 and t15 to t16 of the time chart C12, refrigerant with an arbitrary flow rate is distributed to the refrigerating evaporator 11 and the freezing evaporator 211. For example, a switching period of the switching valve 50 of FIG. 2 or the three-way flow rate control valve 60 of FIG. 3A may be set as 60 seconds, the amount of time during which refrigerant is circulated to the refrigerating evaporator 11 may be set as 48 seconds (a duty ratio of 80%), and the amount of time during which refrigerant is circulated to the freezing evaporator 21 may be set as 12 seconds (a duty ratio of 20%). In this case, generally, cooling of the refrigerating compartment 10 is completed before cooling of the freezing compartment 20 is completed, and afterwards, refrigerant is circulated to the freezing evaporator 21. In an embodiment, even when cooling of the refrigerating compartment 10 is completed as above, as illustrated in t11 to t12 and t16 to t17 of the time chart C12, a predetermined amount of refrigerant is circulated to the refrigerating evaporator 11 to keep cooling the refrigerating compartment 10. In this case, the switcher switches a refrigerant flow path to flow a refrigerant of a preset flow rate, which is smaller than the first flow rate of the refrigerant circulated to the refrigerating evaporator 11 before cooling of the refrigerating compartment 10 is completed but is not zero, to the refrigerating evaporator 11.

Alternatively, a duty ratio of the switching valve 50 or the three-way flow rate control valve 60 that allows temperatures of both the refrigerating compartment 10 and the freezing compartment 20 to simultaneously reach a target temperature may be set on the basis of a temperature change of the refrigerating compartment 10 and the freezing compartment 20 in a previous cycle, so that cooling of the refrigerating compartment 10 and cooling of the freezing compartment 20 are ended simultaneously. Also, after cooling of the refrigerating compartment 10 and the freezing compartment 20 has been started, a difference in times at which temperatures of the refrigerating compartment 10 and the freezing compartment 20 reach the target temperature may be predicted from the temperature change, and the duty ratio of the switching valve 50 or the three-way flow rate control valve 60 may be controlled on the basis of the time difference, so that cooling of the refrigerating compartment 10 and cooling of the freezing compartment 20 are ended simultaneously. Even in this case, when cooling of the refrigerating compartment 10 is completed before cooling of the freezing compartment 20 is completed, then flowing refrigerant to the freezing evaporator 21 is taken into consideration. In an embodiment, even in such a case, a predetermined amount of refrigerant may be circulated to the refrigerating evaporator 11 to keep cooling the refrigerating compartment 10.

Figure 5:
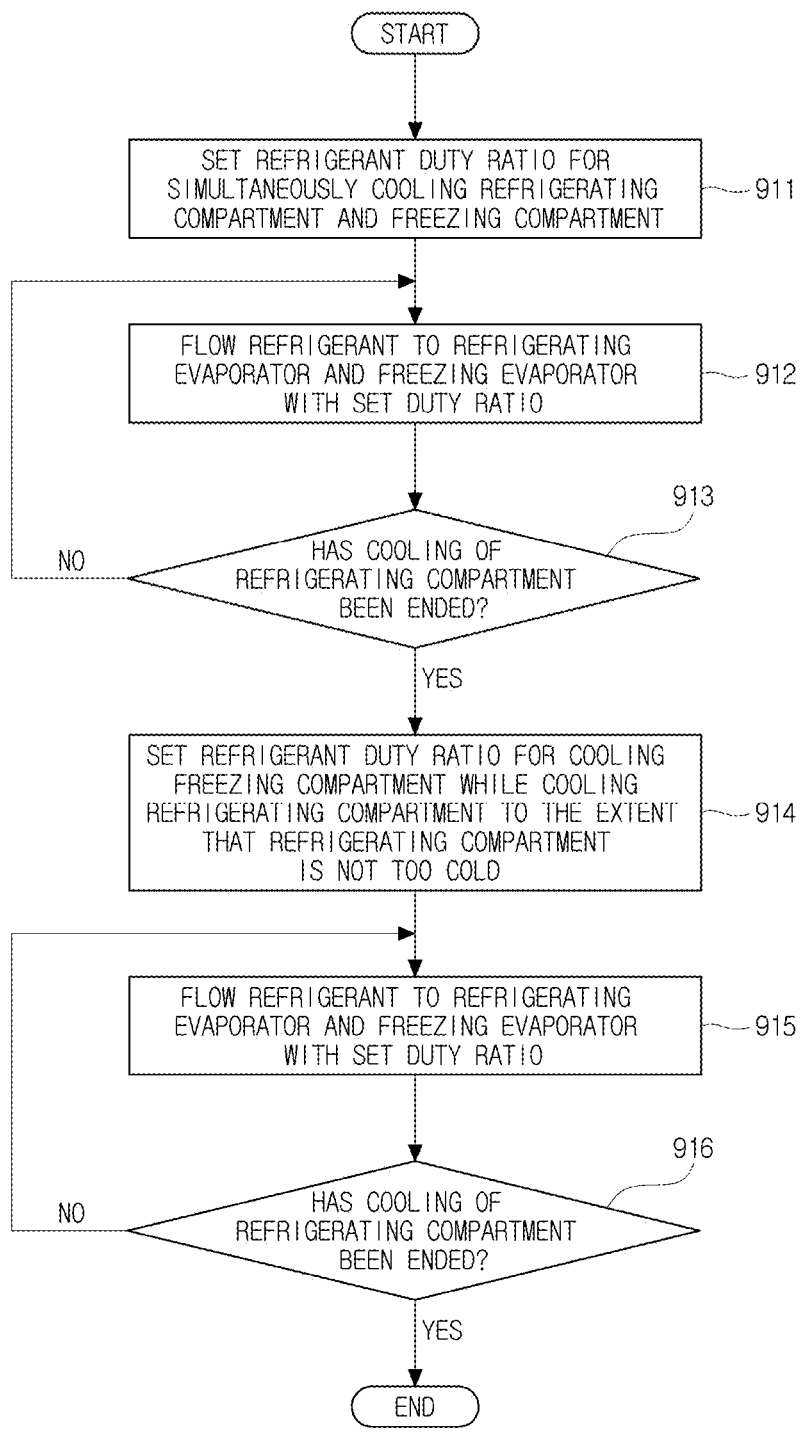
FIG. 5 is a flowchart illustrating an operation example of a controller according to an embodiment of the present disclosure.

FIG. 5 is a flowchart illustrating an operation example of the controller 90 in an embodiment. The switching valve 50 in the refrigeration cycle 100 of FIG. 2 and the three-way flow rate control valve 60 in the refrigeration cycle of FIG. 3A are both controlled by the controller 90 but, hereinafter, to make description common to both, a control object will not be clearly stated except when it is particularly necessary.

As illustrated in FIG. 5, first, the controller 90 sets a refrigerant duty ratio for simultaneously cooling the refrigerating compartment 10 and the freezing compartment 20 (Step 911). Then, the controller 90 flows refrigerant to the refrigerating evaporator 11 and the freezing evaporator 21 with the set duty ratio (Step 912). Then, on the basis of temperature sensed by the refrigerating temperature sensor 16, the controller 90 determines whether cooling of the refrigerating compartment 10 has ended (Step 913).

When it is determined that cooling of the refrigerating compartment 10 has not been ended, the controller 90 repeats Step 912, and when it is determined that cooling of the refrigerating compartment 10 has ended, the controller 90 sets a refrigerant duty ratio for cooling the freezing compartment 20 while cooling the refrigerating compartment 10 to an extent that the refrigerating compartment 10 is not excessively cold (Step 914). Then, the controller 90 flows refrigerant to the refrigerating evaporator 11 and the freezing evaporator 21 with the set duty ratio (Step 915). Then, on the basis of temperature sensed by the freezing temperature sensor 26, the controller 90 determines whether cooling of the freezing compartment 20 has ended (Step 916).

When it is determined that cooling of the freezing compartment 20 has not been ended, the controller 90 repeats Step 915, and when it is determined that cooling of the freezing compartment 20 has ended, the controller 90 ends the process.

Although not mentioned above, when simultaneously cooling the refrigerating compartment 10 and the freezing compartment 20 in an embodiment, an operation mode 1A and an operation mode 1B of an embodiment which will be described below, or an operation mode 1A of an embodiment which will be described below may also be realized.

Since a refrigeration cycle of an embodiment is the same as the refrigeration cycle 200 of FIG. 3A, description thereof will be omitted. However, in an embodiment, in the refrigeration cycle 200, a refrigerating evaporator temperature sensor configured to measure temperature of an inlet of the refrigerating evaporator 11 is installed in the vicinity of the inlet of the refrigerating evaporator 11 and a freezing evaporator temperature sensor configured to measure temperature of an inlet of the freezing evaporator 21 is installed in the vicinity of the inlet of the freezing evaporator 21.

However, in an embodiment, in the refrigeration cycle 200 of FIG. 3A, the controller 90 estimates an evaporation pressure of the refrigerating evaporator 11 on the basis of the temperature of the inlet of the refrigerating evaporator 11 measured by the refrigerating evaporator temperature sensor and estimates an evaporation pressure of the freezing evaporator 21 on the basis of the temperature of the inlet of the freezing evaporator 21 measured by the freezing evaporator temperature sensor. Then, when the evaporation pressure of the refrigerating evaporator 11 is lower than a reference value, the controller 90 controls the evaporation pressure to be a predetermined pressure or higher, and when the evaporation pressure of the freezing evaporator 21 is lower than a reference value, the controller 90 controls the evaporation pressure to be a predetermined pressure or higher. Accordingly, evaporation pressures in the refrigerating evaporator 11 and the freezing evaporator 21 may be maintained as suitable values, and an effect of the ejector 70 may be enhanced. In this case, the reference values applied to the refrigerating evaporator 11 and the freezing evaporator 21 may be different from each other or the same.

Since a refrigeration cycle of an embodiment is the same as the refrigeration cycle 100 of FIG. 2 or the refrigeration cycle 200 of FIG. 3A, description thereof will be omitted.

However, in an embodiment, in the refrigeration cycle 100 of FIG. 2 or the refrigeration cycle 200 of FIG. 3A, an operation mode 1 in which the refrigerating compartment 10 and the freezing compartment 20 are simultaneously cooled and an operation mode 2 in which only the freezing compartment 20 is cooled, are realized. Further, an operation mode 1A in which the refrigerating compartment 10 is cooled first and an operation mode 1B in which the freezing compartment 20 is cooled first are realized as the operation mode 1.

Figure 6:
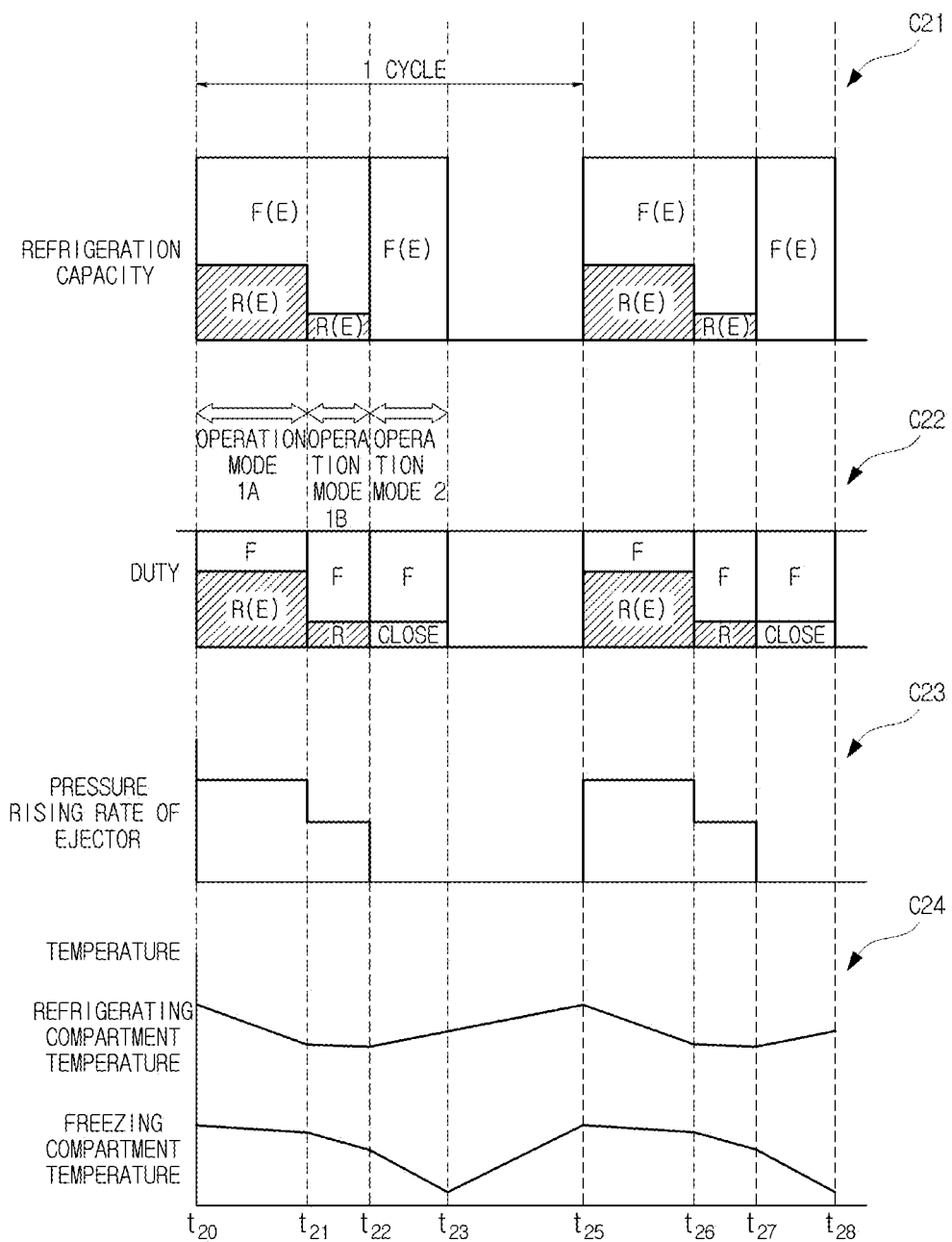
FIG. 6 is a time chart showing operations according to an embodiment of the present disclosure.

FIG. 6 is a time chart showing operations according to an embodiment. A time chart C21 shows a trend of a refrigeration capacity of the refrigerating evaporator 11 (indicated by R(E)) and a refrigeration capacity of the freezing evaporator 21 (indicated by F(E)), a time chart C22 shows a trend of a duty ratio of the refrigerating evaporator 11 (indicated by R) and a duty ratio of the freezing evaporator 21 (indicated by F), a time chart C23 shows a trend of a pressure rising rate of the ejector 70, and a time chart C24 shows a trend of a temperature of the refrigerating compartment 10 and a temperature of the freezing compartment 20.

In an embodiment, by controlling the switching valve 50 of FIG. 2 or the three-way flow rate control valve 60 of FIG. 3A, first, as illustrated in t20 to t22 and t25 to t27 of the time chart C22, the refrigerating compartment 10 and the freezing compartment 20 are simultaneously cooled in the operation mode 1. Then, when cooling of the refrigerating compartment 10 is completed, as illustrated in t22 to t23 and t27 to t28 of the time chart C22, an operation mode 2 in which only the freezing compartment 20 is cooled is performed. In this case, a switcher switches a refrigerant flow path to flow refrigerant of a preset flow rate, which is smaller than a sum of a first flow rate of refrigerant circulated to the refrigerating evaporator 11 before cooling of the refrigerating compartment 10 is completed and a second flow rate of refrigerant circulated to the freezing evaporator 21, only to the freezing compartment 20.

In this process, while the refrigerating compartment 10 and the freezing compartment 20 are being simultaneously cooled in the operation mode 1, distribution of refrigerant to the refrigerating evaporator 11 and the freezing evaporator 21 is switched by the switching valve 50 of FIG. 2 or the three-way flow rate control valve 60 of FIG. 3A to adjust refrigeration capacity of the refrigerating evaporator 11 and the freezing evaporator 21. Specifically, first, as illustrated in t20 to t21 and t25 to t26 of the time chart C22, the refrigerating compartment 10 is initially cooled in the operation mode 1A to increase a pressure rising amount of the ejector 70. In this case, since the refrigeration capacity of the freezing evaporator 21 is decreased, a temperature of the freezing compartment 20 is not lowered much. Therefore, when a predetermined amount of time elapses, as illustrated in t21 to t22 and t26 to t27 of C22, the operation mode 1B in which the freezing compartment 20 is cooled first is performed, and an amount of time taken for cooling the freezing compartment 20 is shortened.

After performing the operation mode 2, opening and closing of only the freezing evaporator 21 is alternately switched by the switching valve 50 of FIG. 2 or the three-way flow rate control valve 60 of FIG. 3A, and the amount of refrigerant flowing in the freezing evaporator 21 is adjusted with a time ratio. In this case, since the amount of refrigerant is adjusted corresponding to refrigeration capacity when the refrigerating compartment 10 and the freezing compartment 20 are simultaneously cooled by temporally narrowing duty, the amount of refrigerant becoming excessive may be prevented.

According to the above configuration, in an embodiment, since simultaneous cooling time of the refrigerating compartment 10 and the freezing compartment 20 becomes longer, a temperature variation width of the refrigerating compartment 10 and the freezing compartment 20 may be reduced, and further, an effect of the ejector 70 may be increased. As a result, a refrigerator with a highly energy efficient characteristic may be realized.

Figure 7:
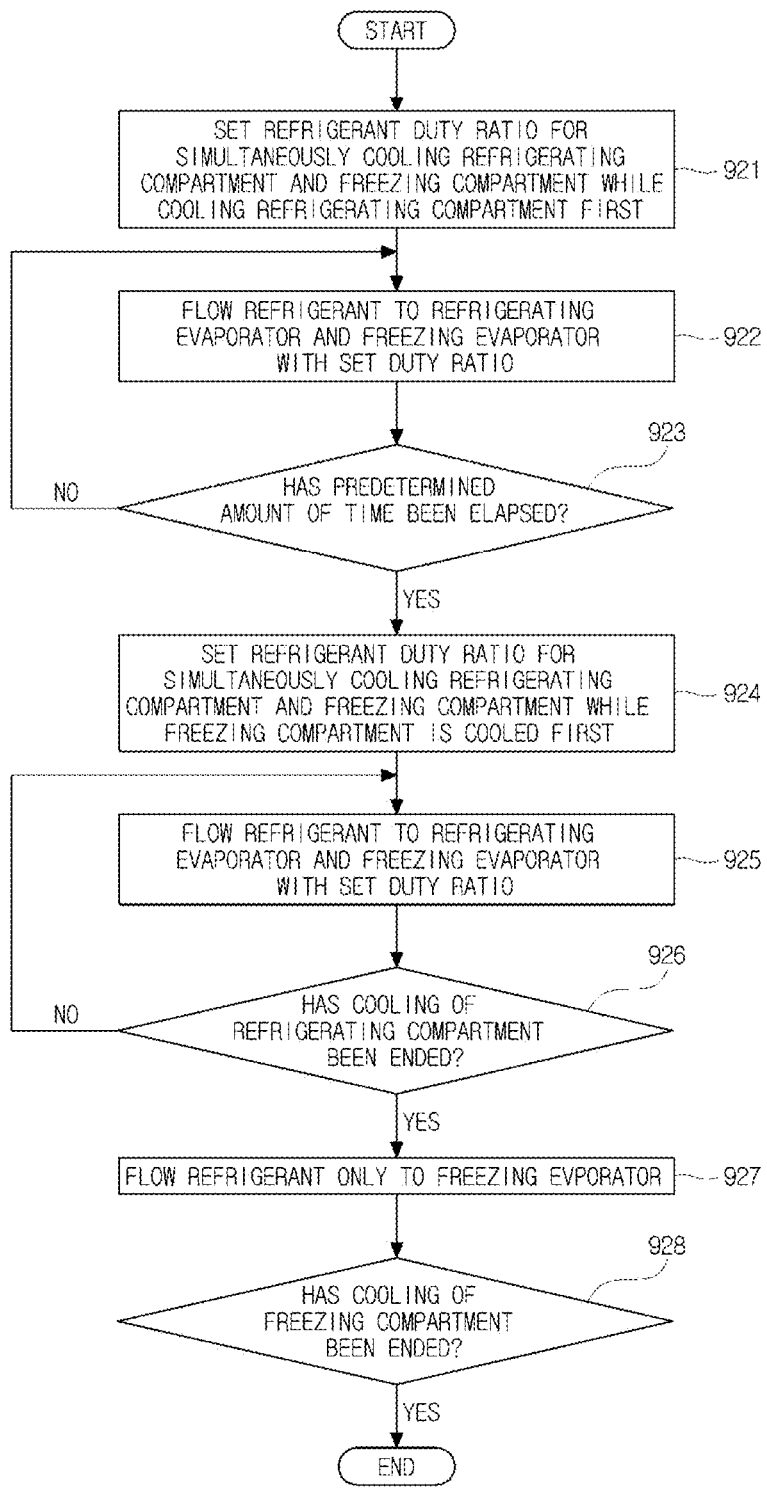
FIG. 7 is a flowchart illustrating an operation example of a controller according to an embodiment of the present disclosure.

FIG. 7 is a flowchart showing an operation example of the controller 90 according to an embodiment. The switching valve 50 in the refrigeration cycle 100 of FIG. 2 and the three-way flow rate control valve 60 in the refrigeration cycle 200 of FIG. 3A are both controlled by the controller 90, but, hereinafter, to make description common to both, a control object will not be clearly stated except when it is particularly necessary.

As illustrated in FIG. 7, first, the controller 90 sets a refrigerant duty ratio for simultaneously cooling the refrigerating compartment 10 and the freezing compartment 20 while cooling the refrigerating compartment 10 first (Step 921). Then, the controller 90 flows refrigerant to the refrigerating evaporator 11 and the freezing evaporator 21 with the set duty ratio (Step 922). Then, the controller 90 determines whether a predetermined amount of time has elapsed after simultaneous cooling of the refrigerating compartment 10 and the freezing compartment 20 has been started (Step 923).

When it is determined that the predetermined amount of time has not elapsed, the controller 90 repeats Step 922, and when it is determined that the predetermined amount of time has been elapsed, the controller 90 sets a refrigerant duty ratio for simultaneously cooling the refrigerating compartment 10 and the freezing compartment 20 while cooling the freezing compartment 20 first (Step 924). Then, the controller 90 flows refrigerant to the refrigerating evaporator 11 and the freezing evaporator 21 with the set duty ratio (Step 925). Then, on the basis of temperature sensed by the refrigerating temperature sensor 16, the controller 90 determines whether cooling of the refrigerating compartment 10 has ended (Step 926).

When it is determined that cooling of the refrigerating compartment 10 has not been ended, the controller 90 repeats Step 925, and when it is determined that cooling of the refrigerating compartment 10 has ended, the controller 90 flows refrigerant only to the freezing evaporator 21 (Step 927). In this case, by controlling opening and closing of the switching valve 50 of FIG. 2 or the three-way flow rate control valve 60 of FIG. 3A, refrigerant is circulated while the amount of refrigerant becoming excessive is prevented. Then, on the basis of temperature sensed by the freezing temperature sensor 26, the controller 90 determines whether cooling of the freezing compartment 20 has ended (Step 928).

When it is determined that cooling of the freezing compartment 20 has not been ended, the controller 90 repeats Step 927, and when it is determined that cooling of the freezing compartment 20 has ended, the controller 90 ends the process.

Although the determination in Step 923 is performed with time, such determination may also be performed on the basis of a value sensed by the refrigerating temperature sensor 16 or the freezing temperature sensor 26.

Since a refrigeration cycle of an embodiment is the same as the refrigeration cycle 100 of FIG. 2 or the refrigeration cycle 200 of FIG. 3, description thereof will be omitted.

However, in an embodiment, in the refrigeration cycle 100 of FIG. 2 or the refrigeration cycle 200 of FIG. 3, from operation modes for simultaneously cooling the refrigerating compartment 10 and the freezing compartment 20, an operation mode 1A in which the refrigerating compartment 10 is cooled first and an operation mode 1B in which only the freezing compartment 20 is cooled are realized. Particularly, in the operation mode 1A, the amount of refrigerant being circulated to the freezing evaporator 21 is reduced to an extent that the amount of refrigerant would not cause a temperature of the freezing compartment 20 to increase.

Figure 8:
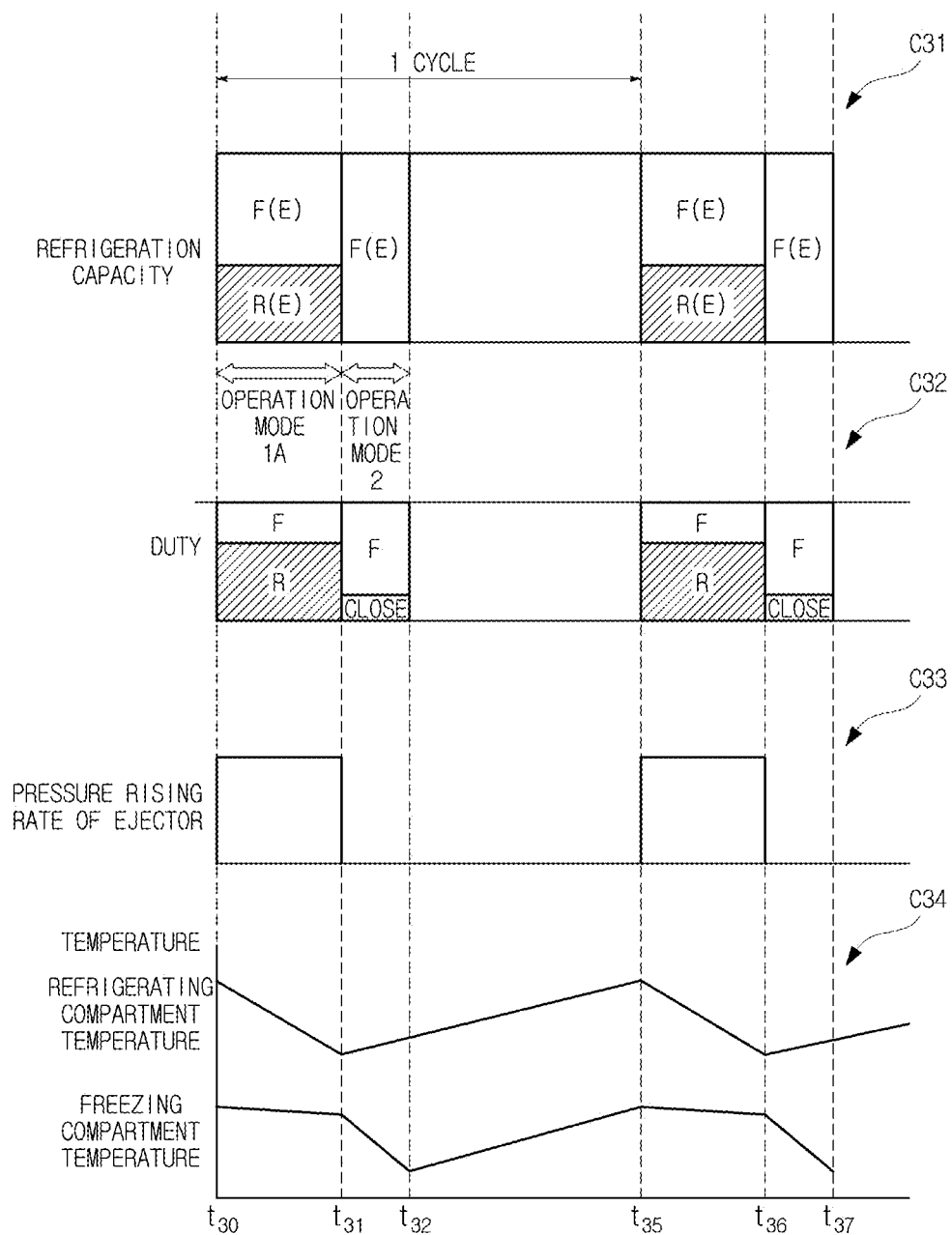
FIG. 8 is a time chart showing operations according to an embodiment of the present disclosure.

FIG. 8 is a time chart showing operations according to an embodiment. A time chart C31 shows a trend of a refrigeration capacity of the refrigerating evaporator 11 (indicated by R(E)) and a refrigeration capacity of the freezing evaporator 21 (indicated by F(E)), a time chart C32 shows a trend of a duty ratio of the refrigerating evaporator 11 (indicated by R) and a duty ratio of the freezing evaporator 21 (indicated by F), a time chart C33 shows a trend of a pressure rising rate of the ejector 70, and a time chart C34 shows a trend of a temperature of the refrigerating compartment 10 and the temperature of the freezing compartment 20.

In an embodiment, by controlling the switching valve 50 of FIG. 2 or the three-way flow rate control valve 60 of FIG. 3A, first, as illustrated in t30 to t31 and t35 to t36 of the time chart C32, the refrigerating compartment 10 and the freezing compartment 20 are simultaneously cooled in an operation mode 1A. In this case, though, as in an embodiment, the operation mode 1A is an operation mode in which the refrigerating compartment 10 is cooled first, among the operation modes 1 in which the refrigerating compartment 10 and the temperature of the freezing compartment 20 are simultaneously cooled. In addition to this, as illustrated in the time chart C34, the operation mode 1A is an operation mode in which the amount of refrigerant flowing in the freezing evaporator 21 is reduced to an extent that the temperature of the freezing compartment 20 would not increase. Then, when cooling of the refrigerating compartment 10 is completed, as illustrated in t31 to t32 and t36 to t37 of the time chart C32, an operation mode 2 in which only the freezing compartment 20 is cooled is performed.

By the above configuration, in an embodiment, an amount of time taken until cooling of the refrigerating compartment 10 is ended may be shortened, and further, an effect of the ejector 70 may be enhanced. As a result, an operation rate of the compressor 30 may be reduced, and a refrigerator with a highly energy efficient characteristic may be realized.

Figure 9:
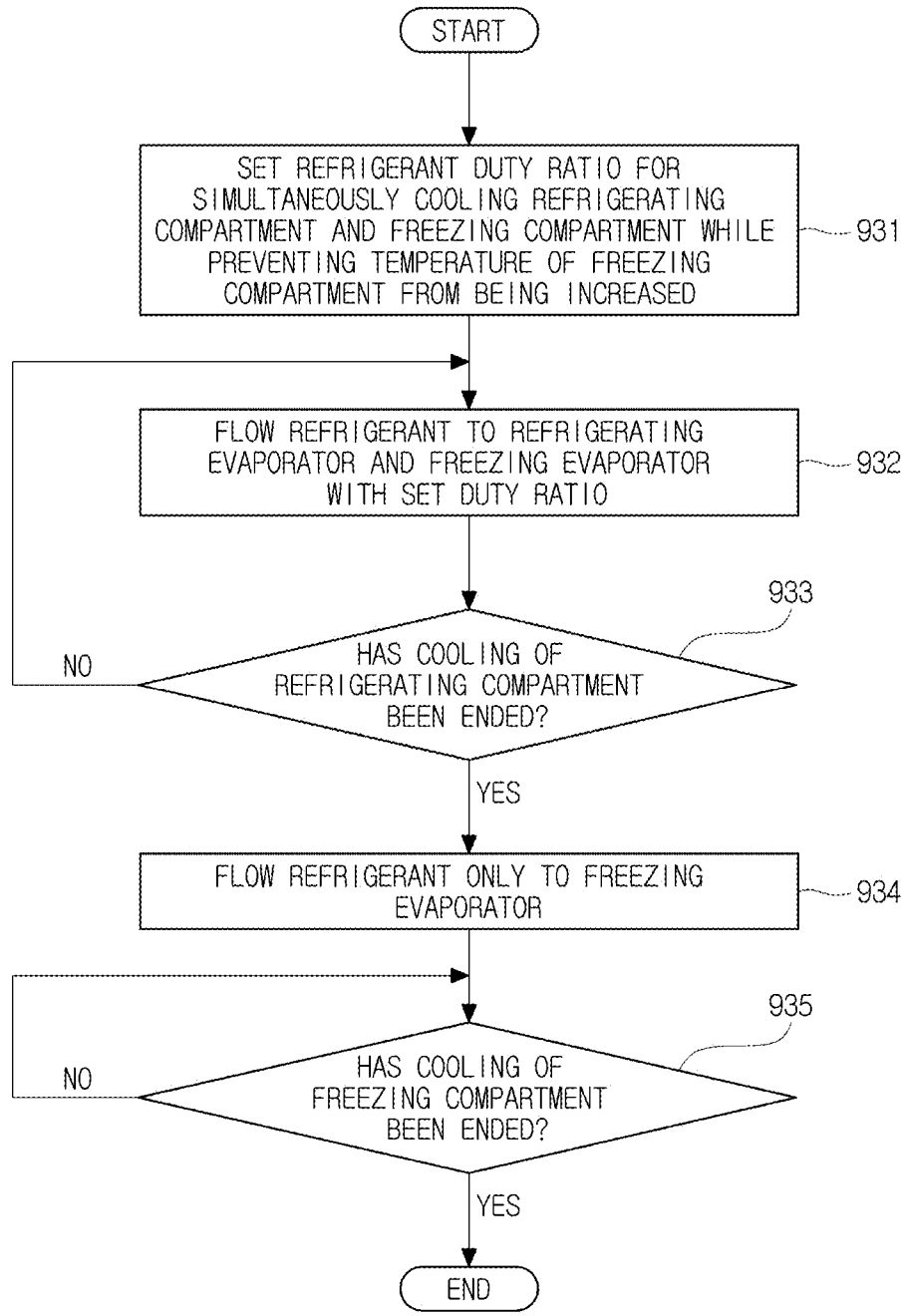
FIG. 9 is a flowchart illustrating an operation example of a controller according to an embodiment of the present disclosure.

FIG. 9 is a flowchart illustrating an operation example of the controller 90 according to an embodiment. The switching valve 50 in the refrigeration cycle 100 of FIG. 2 and the three-way flow rate control valve 60 in the refrigeration cycle 200 of FIG. 3A are both controlled by the controller 90, but, hereinafter, to make description common to both, a control object will not be clearly stated except when it is particularly necessary.

As illustrated in FIG. 9, first, the controller 90 sets a refrigerant duty ratio for simultaneously cooling the refrigerating compartment 10 and the freezing compartment 20 while preventing an increase in the temperature of the freezing compartment 20 (Step 931). Then, the controller 90 flows refrigerant to the refrigerating evaporator 11 and the freezing evaporator 21 with the set duty ratio (Step 932). Then, on the basis of temperature sensed by the refrigerating temperature sensor 16, the controller 90 determines whether cooling of the refrigerating compartment 10 has ended (Step 933).

When it is determined that cooling of the refrigerating compartment 10 has not been ended, the controller 90 repeats Step 932, and when it is determined that cooling of the refrigerating compartment 10 has ended, the controller 90 flows refrigerant only to the freezing evaporator 21 (Step 934). Then, on the basis of temperature sensed by the freezing temperature sensor 26, the controller 90 determines whether cooling of the freezing compartment 20 is ended (Step 935).

When it is determined that cooling of the freezing compartment 20 has not been ended, the controller 90 repeats Step 934, and when it is determined that cooling of the freezing compartment 20 has ended, the controller 90 ends the process.

Figure 10:
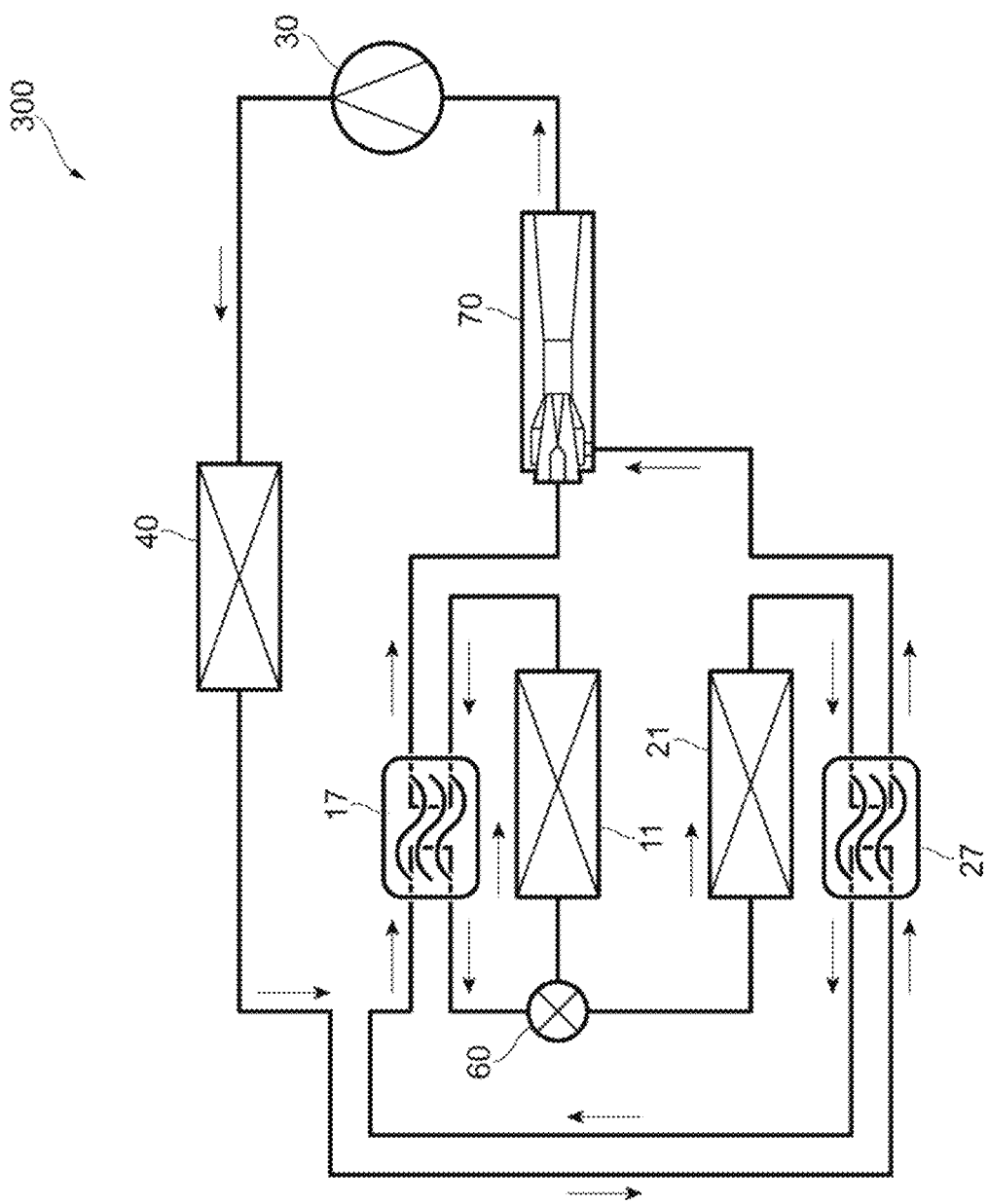
FIG. 10 is a view illustrating a configuration example of a refrigeration cycle according to an embodiment of the present disclosure.

FIG. 10 is a view illustrating configuration of a refrigeration cycle 300 according to an embodiment. The refrigeration cycle 300 basically has the same configuration as the refrigeration cycle 200 of FIG. 3A except that a heat exchanger 17, which is an example of a first heat exchanger, and a heat exchanger 27, which is an example of a second heat exchanger, are installed therein. Although the bypass including the refrigerating accumulator 15, the freezing accumulator 25, and the check valve 80 is not installed in the refrigeration cycle 300 of FIG. 10, the bypass may also be installed therein. Also, for clarity of illustration in FIG. 10, the controller 90, the refrigerating temperature sensor 16, and the freezing temperature sensor 26, which are shown in FIG. 3A, are omitted in FIG. 10.

However, in an embodiment, in the refrigeration cycle 300 of FIG. 10, the heat exchanger 17 performs a heat exchange between a high-temperature refrigerant up to an inlet of the refrigerating evaporator 11 or the freezing evaporator 21 and a low-temperature refrigerant that has passed through the refrigerating evaporator 11. Accordingly, an introduction of liquid refrigerant to the ejector 70 for gaseous single-phase refrigerant may be prevented, and further, an improvement in pressure rising performance may be expected due to an improvement in flow speed of the driving flow of the ejector 70.

Also, in an embodiment, in the refrigeration cycle 300 of FIG. 10, the heat exchanger 27 performs a heat exchange between a high-temperature refrigerant that has passed through the condenser 40 and a low-temperature refrigerant that has passed through the freezing evaporator 21. In this way, by setting refrigerant that performs a heat exchange with the high-temperature refrigerant that has passed through the condenser 40 as the low-temperature refrigerant that has passed through the freezing evaporator 21, since a large temperature difference with the high-temperature refrigerant that has passed through the condenser 40 may be obtained in comparison to when the refrigerant is set as the refrigerant that has passed through the ejector 70, the heat exchange may be performed efficiently.

Further, when liquid refrigerant is passed through an outlet of each evaporator to improve efficiency of the refrigerating evaporator 11 and the freezing evaporator 21, there is a possibility that liquid refrigerant might be introduced into the ejector 70 for gaseous single-phase refrigerant. In this case, by performing a heat exchange between high-temperature refrigerant that has passed through the condenser 40 and low-temperature refrigerant ranging from the refrigerating evaporator 11 to a driving side of the ejector 70 and low-temperature refrigerant from the freezing evaporator 21 to a suctioning side of the ejector 70, an introduction of liquid refrigerant into the ejector 70 may be prevented, and a stable refrigeration circuit that does not decrease the efficiency of the ejector 70 may be configured.

Further, temperatures of refrigerant introduced into the driving side of the ejector 70 and refrigerant introduced into the suctioning side of the ejector 70 may be set to be higher than a dew point temperature, and the ejector 70 may be attached inside a machine room.

Although, in this case, the refrigeration cycle 300 according to an embodiment is a refrigeration cycle basically having the same configuration as the refrigeration cycle 200 of FIG. 3A except that the heat exchanger 17 and the heat exchanger 27 are installed therein, embodiments are not limited thereto. The refrigeration cycle 300 may also be a refrigeration cycle basically having the same configuration as the refrigeration cycle 100 of FIG. 2 except that the heat exchanger 17 and the heat exchanger 27 are additionally installed.

Figure 11:
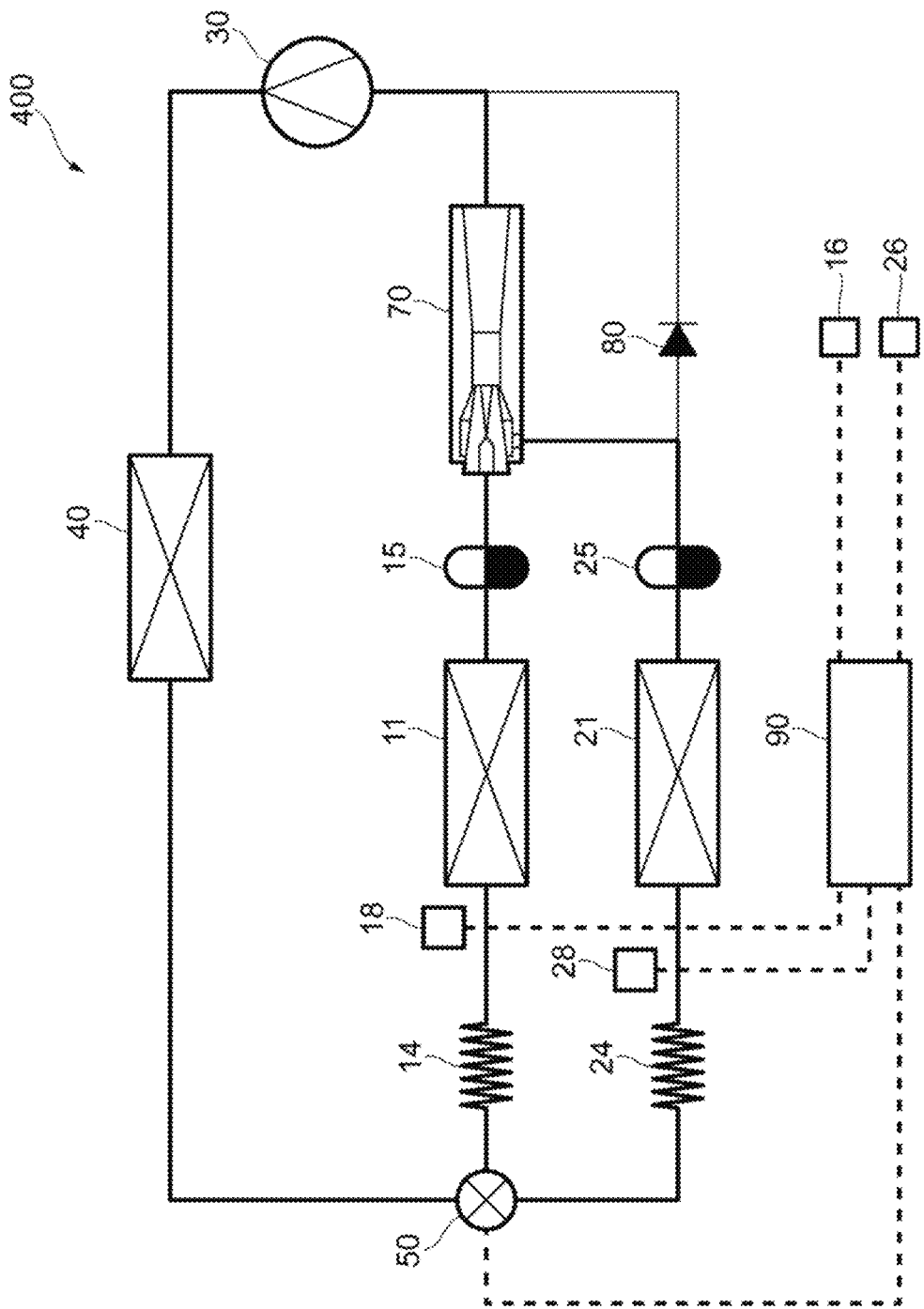
FIG. 11 is a view illustrating a configuration example of a refrigeration cycle according to various embodiments of the present disclosure.

FIG. 11 is a view illustrating configuration of a refrigeration cycle 400, which is an example of a refrigeration cycle according to an embodiment. As illustrated in FIG. 11, the refrigeration cycle 400 has the same configuration as the refrigeration cycle 100 of FIG. 2 except that a refrigerating evaporator temperature sensor 18 configured to measure temperature of an inlet of a refrigerating evaporator 11 is installed in the vicinity of the inlet of the refrigerating evaporator 11, which is an example of a first cooler, and a freezing evaporator temperature sensor 28 configured to measure temperature of an inlet of a freezing evaporator 21 is installed in the vicinity of the inlet of the freezing evaporator 21, which is an example of a second cooler. However, the positions of the refrigerating evaporator temperature sensor 18 and the freezing evaporator temperature sensor 28 are merely examples, and the refrigerating evaporator temperature sensor 18 and the freezing evaporator temperature sensor 28 may also be installed in the vicinity of outlets of the refrigerating evaporator 11 and the freezing evaporator 21, respectively. Alternatively, the refrigerating evaporator temperature sensor 18 and the freezing evaporator temperature sensor 28 may also be installed in the vicinity of a driving side of the ejector 70 and a suctioning side of the ejector 70, respectively. The refrigerating evaporator temperature sensor 18 and the freezing evaporator temperature sensor 28 are examples of a temperature sensor.

The refrigeration cycle 400 distributes refrigerant to the switching valve 50 and supplies refrigerant to the refrigerating evaporator 11 and the freezing evaporator 21 during cooling. In this case, the switching valve 50 switches a flow path with time division and changes a refrigerant ratio with the time ratio (duty ratio) to adjust a refrigeration capacity and a flow rate ratio.

Figure 12:
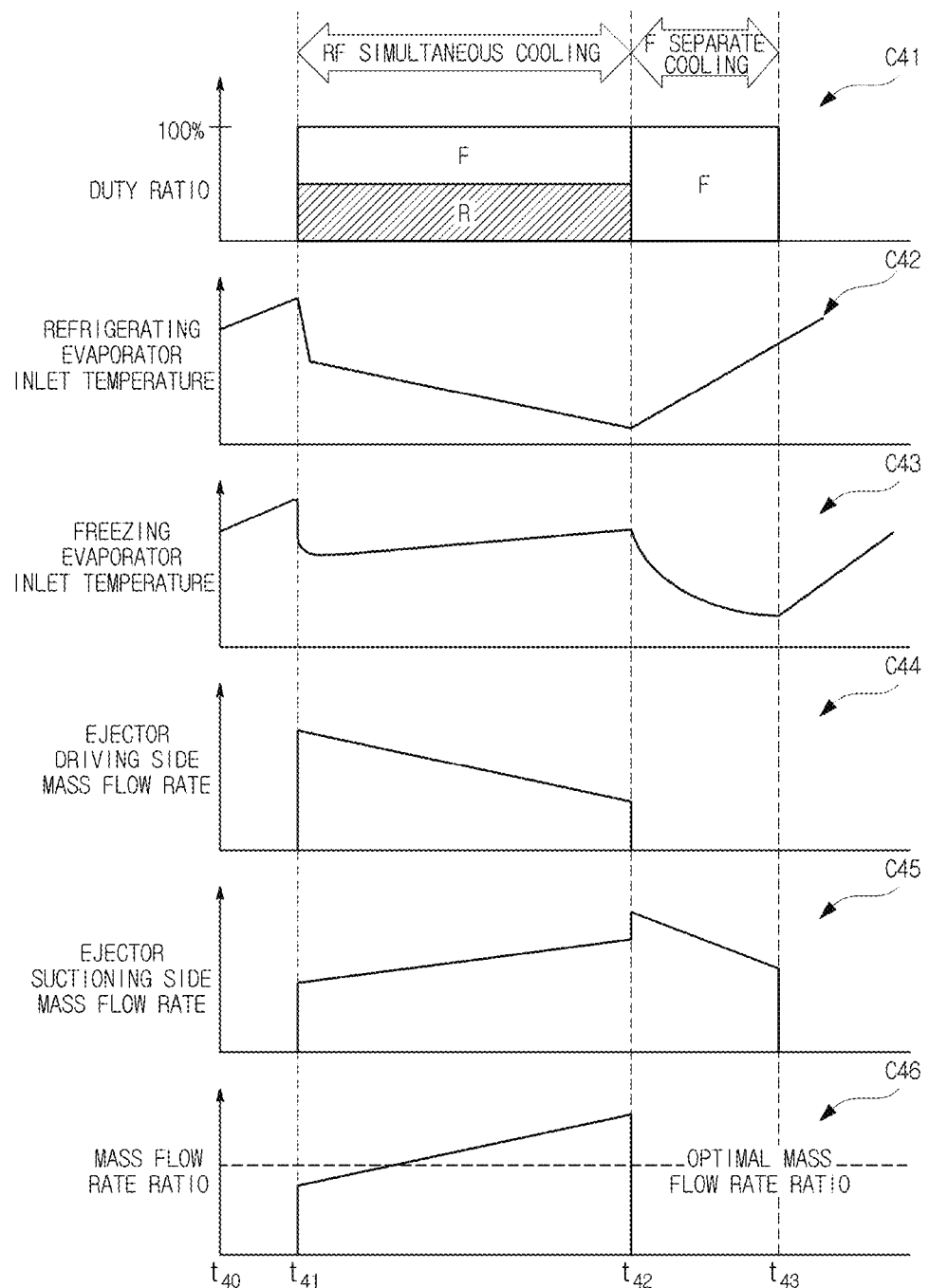
FIG. 12 is a time chart showing a control example of a flow rate ratio during general cooling.

FIG. 12 is a time chart illustrating a control example of a flow rate ratio during general cooling. A time chart C41 shows a trend of a duty ratio of the refrigerating evaporator 11 (indicated by R) and a duty ratio of the freezing evaporator 21 (indicated by F), a time chart C42 shows a trend of temperature of an inlet of the refrigerating evaporator 11, a time chart C43 shows a trend of temperature of an inlet of the freezing evaporator 21, a time chart C44 shows a trend of a mass flow rate at a driving side of the ejector 70, a time chart C45 shows a trend of a mass flow rate at a suctioning side of the ejector 70, and a time chart C46 shows a trend of a mass flow rate ratio.

During general control of flow rate ratio, as shown in the time chart C41, the refrigerating compartment 10 and the freezing compartment 20 are simultaneously cooled (indicated by "RF simultaneous cooling"), and when cooling of one of the refrigerating compartment 10 and the freezing compartment 20 is completed, the other thereof is separately cooled (indicated by "F separate cooling"). In this case, the ejector 70 is operated in a simultaneous cooling period of the refrigerating compartment 10 and the freezing compartment 20 (a period indicated by "RF simultaneous cooling"). Generally, during the simultaneous cooling period of the refrigerating compartment 10 and the freezing compartment 20, as shown in t41 to t42 of the time chart T41, the duty ratio of the refrigerating evaporator 11 and the freezing evaporator 21, i.e., a volume flow rate ratio between the driving side and the suctioning side of the ejector 70 (=volume flow rate at suctioning side/volume flow rate at driving side), is controlled to be constant.

However, as shown in t41 to t42 of the time chart C42 and t41 to t42 of the time chart C43, temperatures of the inlets of the refrigerating evaporator 11 and the freezing evaporator 21 are changed in accordance with cooling temperature, and accordingly, refrigerant densities at the driving side and the suctioning side of the ejector 70 are also changed. Accordingly, as shown in t41 to t42 of the time chart C44 and t41 to t42 of the time chart C45, mass flow rates at the driving side and the suctioning side of the ejector 70 are changed. As a result, even when a time ratio (duty ratio) of flow rate switching of the switching valve 50 is made constant, as shown in t41 to t42 of the time chart C46, the mass flow rate ratio is not constant, and the ejector 70 is not controlled with a mass flow rate ratio point that optimizes the efficiency of the ejector 70.

Therefore, in an embodiment, in the refrigeration cycle 400 of FIG. 11, even in a transition state during the simultaneous cooling period of the refrigerating compartment 10 and the freezing compartment 20, a duty ratio between the refrigerating evaporator 11 and the freezing evaporator 21, i.e., a volume flow rate ratio between the driving side and the suctioning side of the ejector 70 (=volume flow rate at suctioning side/volume flow rate at driving side) is changed on the basis of temperature changes of the refrigerating evaporator 11 and the freezing evaporator 21, and a mass flow rate ratio between the driving side and the suctioning side of the ejector 70 is made constant, thereby maximizing the efficiency of the ejector 70.

Figure 13:
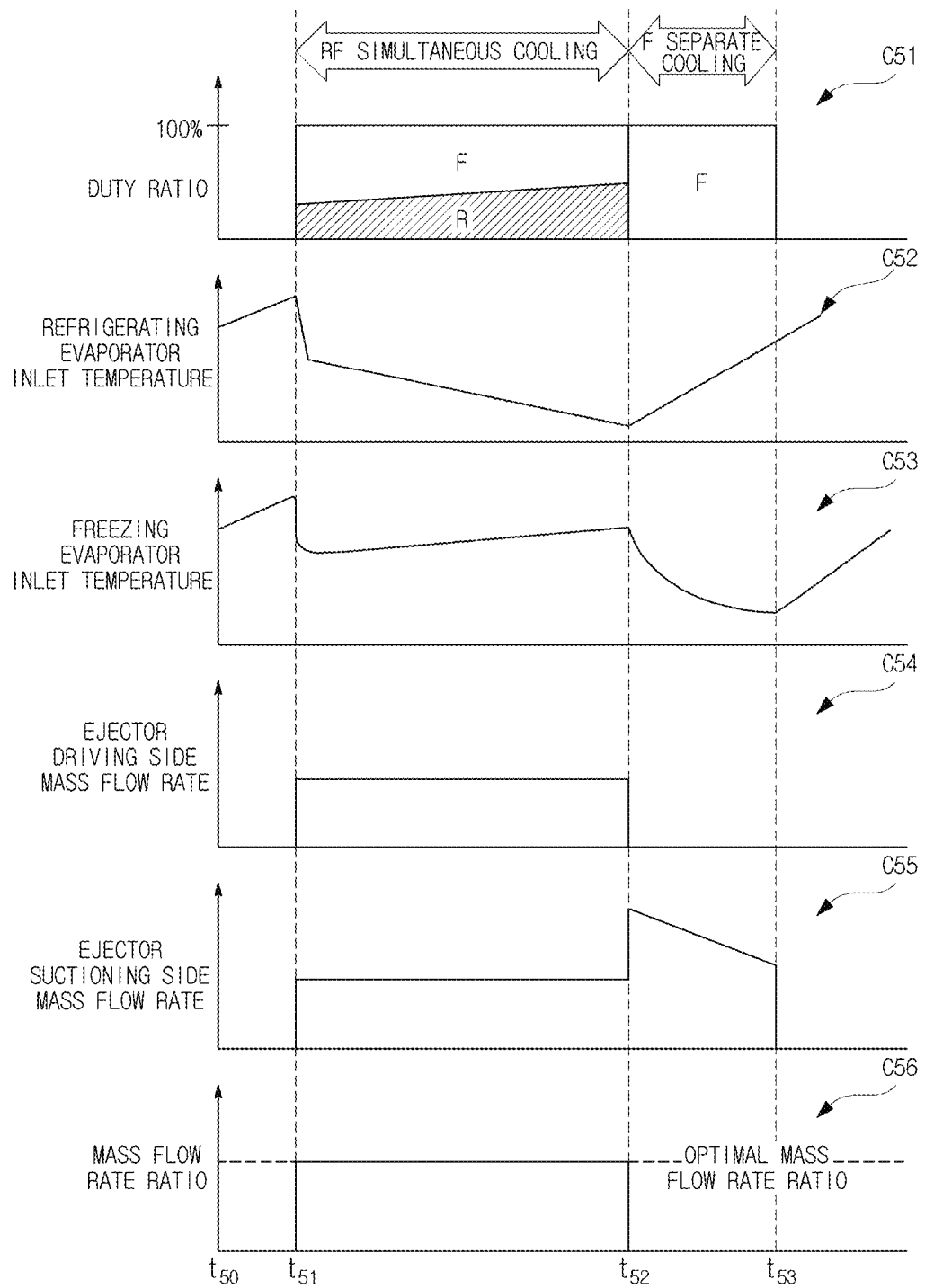
FIG. 13 is a time chart showing a control example of a flow rate ratio during cooling according to an embodiment of the present disclosure.

FIG. 13 is a time chart illustrating a control example of a flow rate ratio during cooling according to an embodiment. A time chart C51 shows a trend of a duty ratio of the refrigerating evaporator 11 (indicated by R) and a duty ratio of the freezing evaporator 21 (indicated by F), a time chart C52 shows a trend of temperature of an inlet of the refrigerating evaporator 11, a time chart C53 shows a trend of temperature of an inlet of the freezing evaporator 21, a time chart C54 shows a trend of a mass flow rate at a driving side of the ejector 70, a time chart C55 shows a trend of a mass flow rate at a suctioning side of the ejector 70, and a time chart C56 shows a trend of a mass flow rate ratio.

During control of flow rate ratio according to an embodiment, as shown in t51 to t52 of the time chart C52, since temperature of the inlet of the refrigerating evaporator 11 is decreased, and accordingly, a refrigerant density is decreased, a mass flow rate at the driving side of the ejector 70 is also decreased. Therefore, to make the mass flow rate constant, as shown in t51 to t52 of the time chart C51, a duty ratio at the refrigerating evaporator 11 side is increased, and a decrease of mass flow rate at the driving side of the ejector 70 is suppressed in accordance with the decrease of temperature of the inlet of the refrigerating evaporator 11. Accordingly, as shown in t51 to t52 of the time chart C56, the mass flow rate ratio at the driving side and the suctioning side of the ejector 70 is controlled to be constant.

Although, in this case, an example has been illustrated in which control is performed on the temperature of the inlet of the refrigerating evaporator 11 in the time chart C52 and the temperature of the inlet of the freezing evaporator 21 in the time chart C53 based only on the temperature of the inlet of the refrigerating evaporator 11, embodiments are not limited thereto. The control may also be performed on the basis of both the temperature of the inlet of the refrigerating evaporator 11 and the temperature of the inlet of the freezing evaporator 21 or on the basis of only the temperature of the inlet of the freezing evaporator 21.

Figure 14:
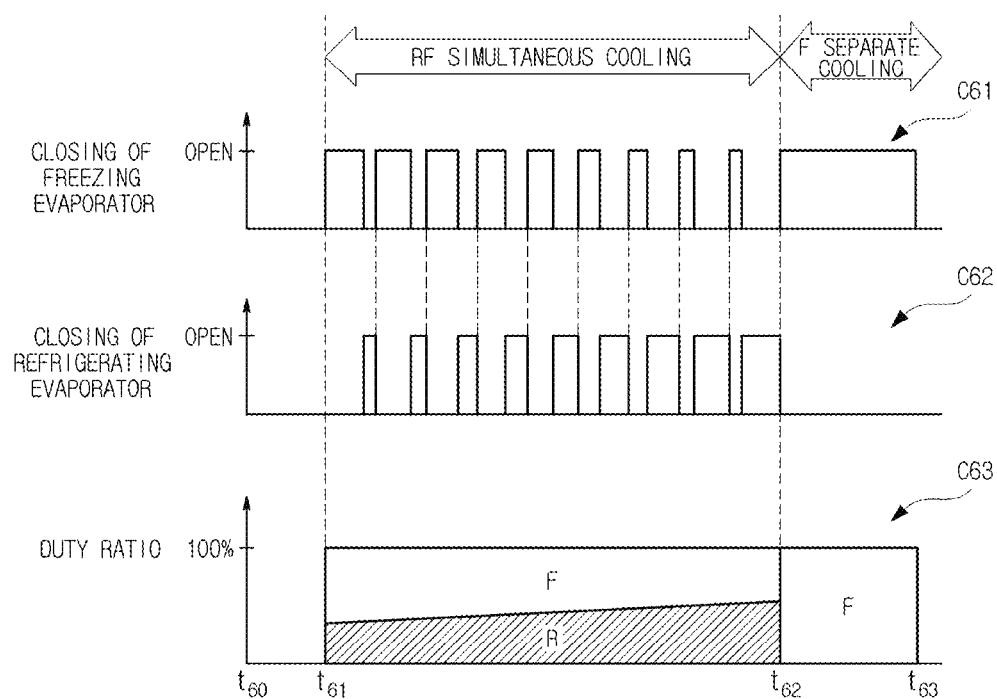
FIG. 14 is a time chart showing a control example of a switching valve according to an embodiment of the present disclosure.

FIG. 14 is a time chart illustrating a control example of the switching valve 50 according to an embodiment. A time chart C61 shows a trend of opening and closing of the freezing evaporator 21 side of the switching valve 50, a time chart C62 shows a trend of opening and closing of the refrigerating evaporator 11 side of the switching valve 50, and a time chart C63 shows a trend of a duty ratio of the refrigerating evaporator 11 (indicated by R) and a duty ratio of the freezing evaporator 21 (indicated by F).

During control of the switching valve 50 according to an embodiment, as shown in t61 to t62 of the time chart C61 and t61 to t62 of the time chart C62, simultaneous cooling of the refrigerating compartment 10 and the freezing compartment 20 is performed (indicated by "RF simultaneous cooling") by alternately opening flow paths to the refrigerating evaporator 11 and the freezing evaporator 21 in time series with a single switching valve 50. In this case, a volume flow rate ratio between the refrigerating evaporator 11 side and the freezing evaporator 21 side is controlled to be changed by a time ratio between the amount of time in which the freezing evaporator 21 side is kept open ("open" in the time chart C61) and the amount of time in which the refrigerating evaporator 11 side is kept open ("open" in the time chart C62).

Next, operations of the controller 90 according to an embodiment will be described. There is a case in which the controller 90 performs control using a table and a case in which the controller 90 performs control using a function.

First, the case in which the controller 90 performs control using a table will be described.

FIG. 15 is a view illustrating an example of such a table. As illustrated in FIG. 15, transition state mode numbers are matched to lower limit temperature values, upper limit temperature values, time values, and duty ratios in the table.

The transition state mode numbers are reference numbers used to refer to the table. The transition state mode numbers take both positive and negative values from 0. In this case, the transition state mode number will be indicated by n.

The lower limit temperature values are lower limit values of temperature ranges of the refrigerating evaporator 11 which are set with respect to the transition state mode numbers. In this case, the lower limit temperature values will be indicated by Temp_L[n] corresponding to the transition state mode numbers n. Also, with respect to arbitrary n, Temp_L[n]<Temp_L[n+1] is established. That is, Temp_L[n] is increased as the transition state mode number n is increased.

The upper limit temperature values are upper limit values of temperature ranges of the refrigerating evaporator 11 which are set with respect to the transition state mode numbers. In this case, the upper limit temperature values will be indicated by Temp_H[n] corresponding to the transition state mode numbers n. Also, with respect to arbitrary n, Temp_H[n]<Temp_H[n+1] is established. That is, Temp_H[n] is increased as the transition state mode number n is increased. Also, with respect to arbitrary n, Temp_H[n]=Temp_L[n+1] is established. That is, a temperature range from Temp_L[n] to Temp_H[n] corresponds to the transition state mode number n, and a temperature range from Temp_L[n+1] to Temp_H[n+1], which is an adjacent temperature range at a higher side than the above temperature range, corresponds to the transition state mode number n+1. In this case, to prevent hunting, a temperature range defined by upper limit temperature values and lower limit temperature values, instead of temperature values of the refrigerating evaporator 11, is set.

The time values are values of standby time for checking a temperature change set with respect to a temperature range from an upper limit temperature value to a lower limit temperature value. In this case, time values corresponding to transition state mode numbers n will be indicated by Time[n].

The duty ratios are duty ratios set with respect to a temperature range from an upper limit temperature value to a lower limit temperature value. In this case, the duty ratios corresponding to transition state mode numbers n will be indicated by Duty [n].

Figure 16:
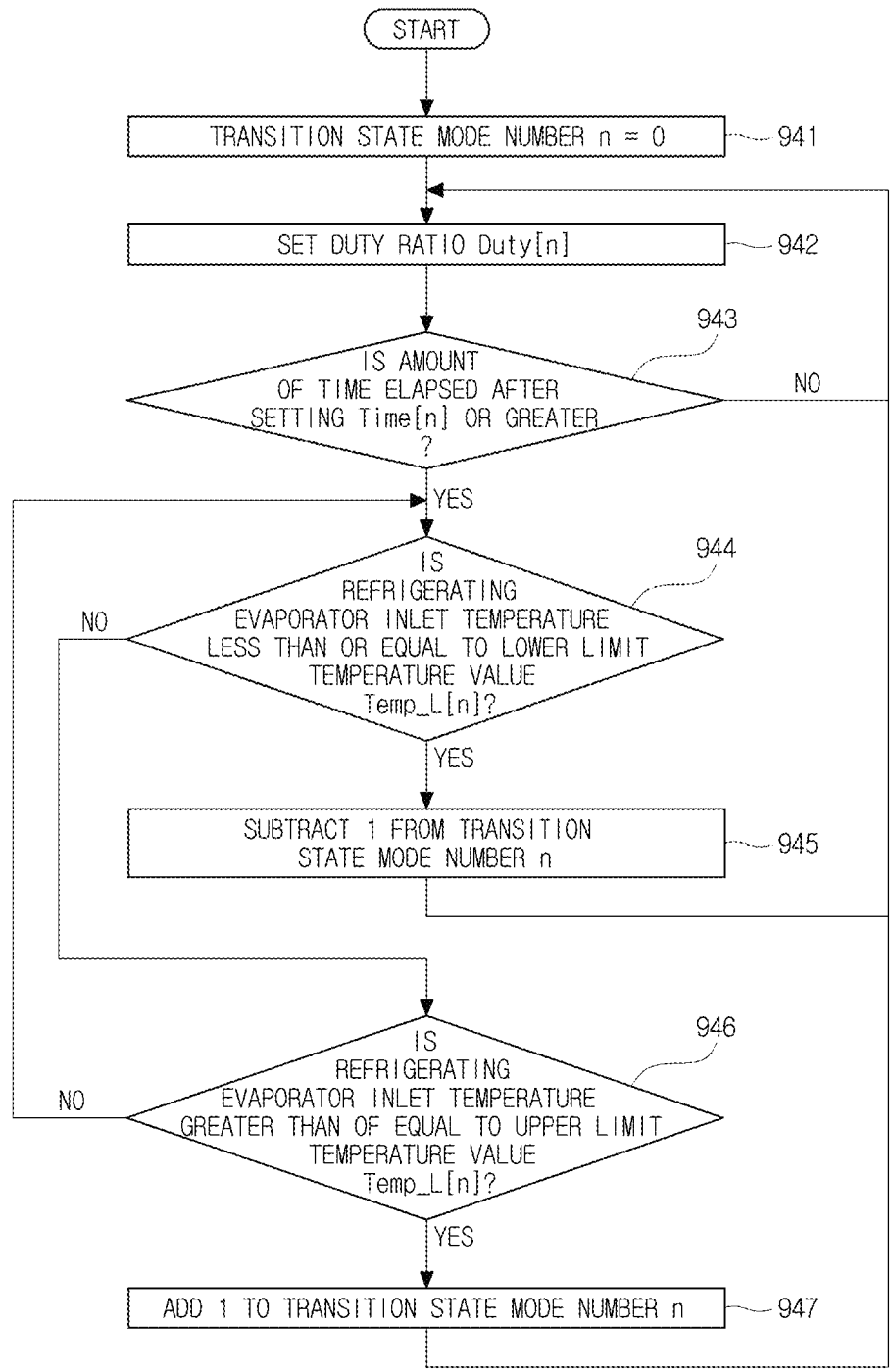
FIG. 16 is a flowchart illustrating an operation example when control is performed using a table of the controller according to an embodiment of the present disclosure.

FIG. 16 is a flowchart illustrating an operation example when the controller 90 performs control using a table. Such an operation is executed after the compressor 30 is started during simultaneous cooling of the refrigerating compartment 10 and the freezing compartment 20.

As illustrated in FIG. 16, first, the controller 90 sets a transition state mode number n to 0 (Step 941). Then, the controller 90 sets a duty ratio Duty[n] corresponding to the transition state mode number n (Step 942). Accordingly, the switching valve 50 is controlled, and refrigerant is circulated to the refrigerating evaporator 11 and the freezing evaporator 21 with the set duty ratio Duty[n].

Next, the controller 90 determines whether the amount of time that has been elapsed after the duty ratio Duty[n] is set has reached a time value Time[n] or greater (Step 943). When it is determined that the amount of time that has been elapsed after the duty ratio Duty[n] is set has not reached the time value Time[n] or greater, the controller 90 returns the process to Step 942, resets a duty ratio Duty[n] corresponding to the same transition state mode number n, and executes a subsequent process.

When it is determined that the amount of time that has been elapsed after the duty ratio Duty[n] is set has reached the time value Time[n] or greater, the controller 90 determines whether temperature of an inlet of the refrigerating evaporator 11 measured by the refrigerating evaporator temperature sensor 18 is less than or equal to a lower limit temperature value Temp_L[n] (Step 944). When it is determined that the temperature of the inlet of the refrigerating evaporator 11 measured by the refrigerating evaporator temperature sensor 18 is less than or equal to the lower limit temperature value Temp_L[n], the controller 90 subtracts 1 from the transition state mode number n (Step 945), returns the process to Step 942, sets a duty ratio Duty[n] corresponding to the transition state mode number n from which 1 is subtracted, and executes a subsequent process.

When it is determined that the temperature of the inlet of the refrigerating evaporator 11 measured by the refrigerating evaporator temperature sensor 18 is not less than or equal to the lower limit temperature value Temp_L[n], the controller 90 determines whether the temperature of the inlet of the refrigerating evaporator 11 measured by the refrigerating evaporator temperature sensor 18 is greater than or equal to an upper limit temperature value Temp_H[n] (Step 946). When it is determined that the temperature of the inlet of the refrigerating evaporator 11 measured by the refrigerating evaporator temperature sensor 18 is greater than or equal to the upper limit temperature value Temp_H[n], the controller 90 adds 1 to the transition state mode number n (Step 947), returns the process to Step 942, sets a duty ratio Duty[n] corresponding to the transition state mode number n to which 1 is added, and executes a subsequent process.

When it is determined that the temperature of the inlet of the refrigerating evaporator 11 measured by the refrigerating evaporator temperature sensor 18 is not greater than or equal to the upper limit temperature value Temp_H[n], the controller 90 returns the process to Step 944, and re-determines whether the temperature of the inlet of the refrigerating evaporator 11 measured by the refrigerating evaporator temperature sensor 18 is less than or equal to the lower limit temperature value Temp_L[n]. Then, the controller 90 executes a subsequent process.

The controller 90 repeats the above process until it is determined that simultaneous cooling of the refrigerating compartment 10 and the freezing compartment 20 is completed, and when it is determined that simultaneous cooling of the refrigerating compartment 10 and the freezing compartment 20 has been completed, ends the process.

Next, the case in which the controller 90 performs control using a function will be described.

Although set values are pre-stored in a table in the case of performing control using the table, temperature of the inlet of the refrigerating evaporator 11 measured by the refrigerating evaporator temperature sensor 18 and a correlation between duty ratios are pre-stored as functions in the case of performing control using a function. In this case, the temperature of the inlet of the refrigerating evaporator 11 will be referred to as T, a duty ratio will be referred to as Duty, and a function will be referred to as f That is, obtaining the duty ratio Duty from the temperature T of the inlet of the refrigerating evaporator 11 using the function f is shown as Duty=f(T). In this way, a duty ratio may be precisely controlled in the case of performing control using a function.

Figure 17:
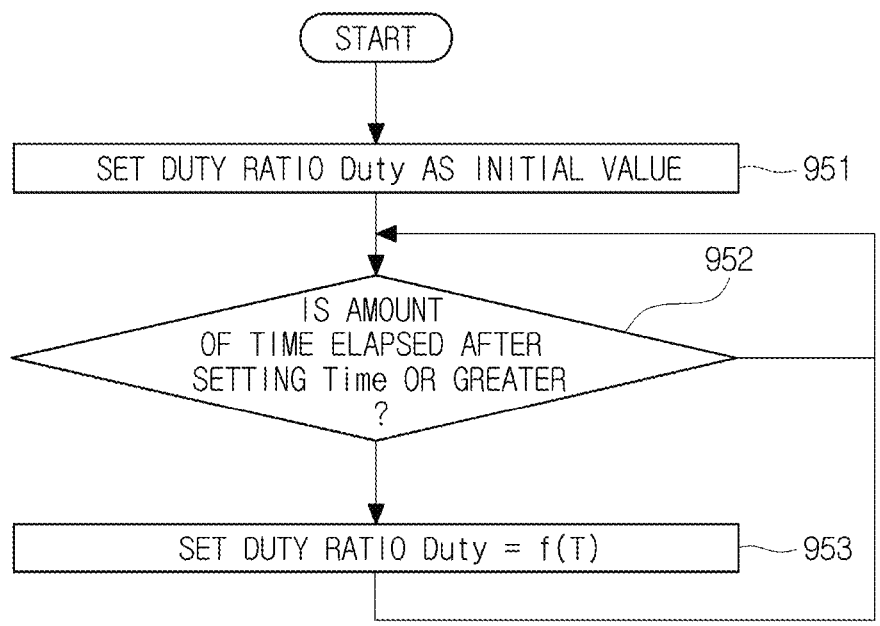
FIG. 17 is a flowchart illustrating an operation example when control is performed using a function of the controller according to an embodiment of the present disclosure.

FIG. 17 is a flowchart illustrating an operation example when the controller 90 performs control using a function according to an embodiment. The operation is executed after the compressor 30 is started during simultaneous cooling of the refrigerating compartment 10 and the freezing compartment 20.

As illustrated in FIG. 17, first, the controller 90 sets a duty ratio Duty as an initial value (Step 951). Accordingly, the switching valve 50 is controlled, and refrigerant is circulated to the refrigerating evaporator 11 and the freezing evaporator 21 with the set duty ratio Duty.

Next, the controller 90 determines whether the amount of time that has been elapsed after the duty ratio Duty is set has reached a preset time value Time or greater (Step 952). When it is determined that the amount of time that has been elapsed after the duty ratio Duty is set has not reached the time value Time or greater, the controller 90 repeats the process of Step 952.

When it is determined that the amount of time that has been elapsed after the duty ratio Duty is set has reached the time value Time or greater, the controller 90 obtains the duty ratio Duty by Duty=f(T), using the temperature T of the inlet of the refrigerating evaporator 11 measured by the refrigerating evaporator temperature sensor 18 and the function f, and sets the obtained duty ratio Duty (Step 953). Accordingly, the switching valve 50 is controlled, and refrigerant is circulated to the refrigerating evaporator 11 and the freezing evaporator 21 with the set duty ratio Duty.

Then, the controller 90 returns the process to Step 952 and determines whether the amount of time that has been elapsed after the duty ratio Duty is set has reached the time value Time or greater. Then, the controller 90 executes a subsequent process.

Although control is performed on the basis of the temperature of the inlet of the refrigerating evaporator 11 measured by the refrigerating evaporator temperature sensor 18 in this operation example, control may also be performed on the basis of temperature of an inlet of the freezing evaporator 21 measured by the freezing evaporator temperature sensor 28. In addition, control may also be performed on the basis of both the temperature of the inlet of the refrigerating evaporator 11 measured by the refrigerating evaporator temperature sensor 18 and the temperature of the inlet of the freezing evaporator 21 measured by the freezing evaporator temperature sensor 28.

Although control is performed on the basis of temperature values of the temperature of the inlet of the refrigerating evaporator 11 and the temperature of the inlet of the freezing evaporator 21 in this operation example, control may also be performed on the basis of temperature change values of the temperature of the inlet of the refrigerating evaporator 11 and the temperature of the inlet of the freezing evaporator 21.

Since a refrigeration cycle according to an embodiment is the same as the refrigeration cycle 100 of FIG. 2 or the refrigeration cycle 400 of FIG. 11, description thereof will be omitted.

However, in an embodiment, in the refrigeration cycle 100 of FIG. 2 or the refrigeration cycle 400 of FIG. 11, a flow rate ratio is controlled only on the basis of the amount of time that has been elapsed after simultaneous cooling of the refrigerating compartment 10 and the freezing compartment 20 is started. When operation conditions are similar, a temperature change of the refrigerating evaporator 11 is also similar. Therefore, a correlation between the amount of time that has been elapsed after the start of simultaneous cooling and a change in a mass flow rate ratio may be measured in advance, and a control value when changing a duty ratio may be defined on the basis of the measured correlation, thereby changing the control value with time. For example, a table may be prepared by deleting a row in which the transition state mode number n is a negative value from the table of FIG. 15 and also deleting columns of the lower limit temperature value Temp_L[n] and the upper limit temperature value Temp_H[n] therefrom.

Figure 18:
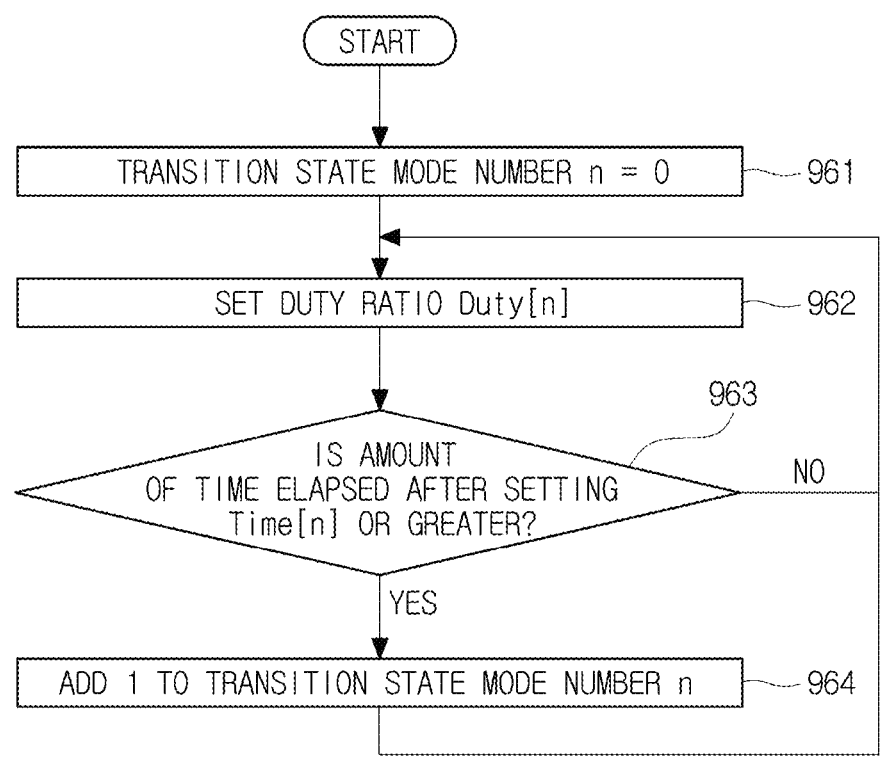
FIG. 18 is a flowchart illustrating an operation example of a controller according to an embodiment of the present disclosure.

FIG. 18 is a flow chart illustrating an operation example of the controller 90 according to an embodiment. The operation is executed after the compressor 30 is started during simultaneous cooling of the refrigerating compartment 10 and the freezing compartment 20.

As illustrated in FIG. 18, first, the controller 90 sets a transition state mode number n to 0 (Step 961). Then, the controller 90 sets a duty ratio Duty[n] corresponding to the transition state mode number n (Step 962). Accordingly, the switching valve 50 is controlled and refrigerant is circulated to the refrigerating evaporator 11 and the freezing evaporator 21 with the set duty ratio Duty[n].

Next, the controller 90 determines whether the amount of time that has been elapsed after the duty ratio Duty[n] is set has reached a time value Time[n] or greater (Step 963). When it is determined that the amount of time that has been elapsed after the duty ratio Duty[n] is set has not reached the time value Time[n] or greater, the controller 90 returns the process to Step 962, resets a duty ratio Duty[n] corresponding to the same transition state mode number n, and executes a subsequent process.

When it is determined that the amount of time that has been elapsed after the duty ratio Duty[n] is set has reached the time value Time[n] or greater, the controller 90 adds 1 to the transition state mode number n (Step 964), returns the process to Step 962, sets a duty ratio Duty[n] corresponding to the transition state mode number n to which 1 is added, and executes a subsequent process.

Since a refrigeration cycle according to an embodiment is the same as the refrigeration cycle 400 of FIG. 11, description thereof will be omitted.

Even when the compressor 30 is operated with an increased number of rotations to recover oil at the time of starting, a mass flow rate ratio between the refrigerating evaporator 11 side and the freezing evaporator 21 side is different from that in the case in which the compressor 30 is operated with a normal number of rotations. That is, when a number of rotations of the compressor 30 is increased, although temperature of the freezing evaporator 21 is lowered at the freezing evaporator 21 side, temperature of the refrigerating evaporator 11 is increased at the refrigerating evaporator 11 side due to a pressure loss of a driving nozzle of the ejector 70. Because of this, a mass flow rate is changed due to a density difference even in this case.

Therefore, in an embodiment, a duty ratio between the refrigerating evaporator 11 and the freezing evaporator 21 is changed even in accordance with the number of rotations of the compressor 30 in addition to the temperatures of the refrigerating evaporator 11 and the freezing evaporator 21 of an embodiment, and mass flow rate ratios at the refrigerating evaporator 11 side and the freezing evaporator 21 side are made constant.

Figure 19:
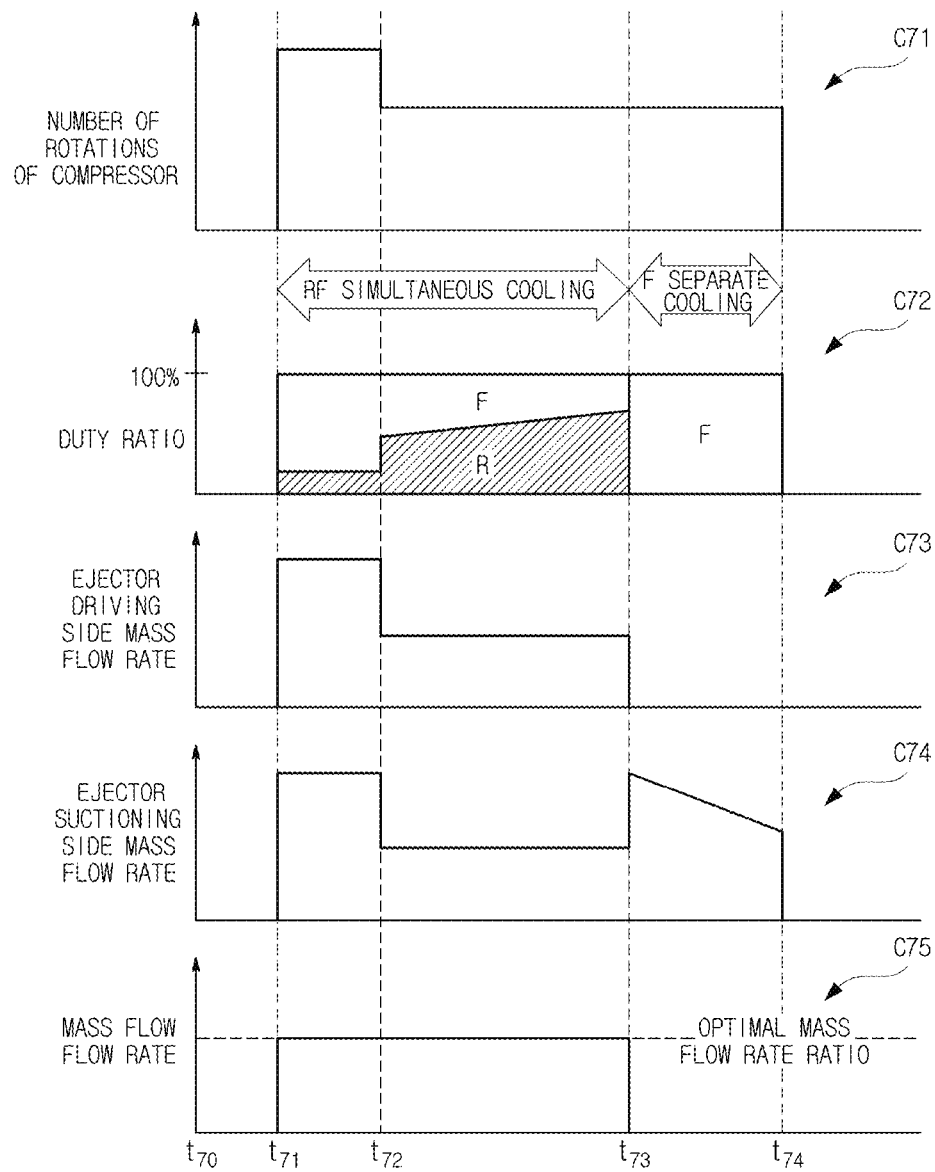
FIG. 19 is a time chart showing a control example of a flow rate ratio during cooling according to an embodiment of the present disclosure.

FIG. 19 is a time chart illustrating a control example of a flow rate ratio during cooling according to an embodiment. A time chart C71 shows a trend of the number of rotations of the compressor 30, a time chart C72 shows a trend of a duty ratio of the refrigerating evaporator 11 (indicated by R) and a duty ratio of the freezing evaporator 21 (indicated by F), a time chart C73 shows a trend of a mass flow rate at a driving side of the ejector 70, a time chart C74 shows a trend of a mass flow rate at a suctioning side of the ejector 70, and a time chart C75 shows a trend of a mass flow rate ratio.

During control of a flow rate ratio according to an embodiment, as shown in t71 to t72 of the time chart C71, the number of rotations of the compressor 30 is increased at the time of starting the compressor 30. Therefore, as shown in t71 to t72 of the time chart C72, a duty ratio of the refrigerating evaporator 11 is decreased. Accordingly, as shown in t71 to t72 of the time chart C75, a mass flow rate ratio between the driving side and the suctioning side of the ejector 70 is controlled to be constant. Although an example in which control is performed only on the basis of the number of rotations of the compressor 30 is illustrated in t71 to t72 of the time chart C72, control may also be performed on the basis of temperatures of the refrigerating evaporator 11 and the freezing evaporator 21 in addition to the number of rotations of the compressor 30. Then, since the number of rotations of the compressor 30 is returned to the normal number of rotations in t72 to t73 of the time chart C72, control is performed as in an embodiment.

Next, operations of the controller 90 according to an embodiment will be described. There is a case in which the controller 90 performs control using a table and a case in which the controller 90 performs control using a function.

First, the case of performing control using a table will be described. In this case, as the table, the table shown in FIG. 15 may be prepared for each number of rotations of the compressor 30. For example, in FIG. 19, a table related to t71 to t72 and a table related to t73 to t74 may be prepared. In the flowchart illustrated in FIG. 16, a table corresponding to the number of rotations of the compressor 30 may be referred to when referring to the table.

Next, the case of performing control using a function will be described. In this case, a temperature T of the inlet of the refrigerating evaporator 11 and the number of rotations Nc of the compressor 30 may be set as two parameters, and from such parameters, a duty ratio Duty may be obtained from Duty=g(T, Nc) using a function g.

Although an example of performing control on the basis of the number of rotations of the compressor 30 in addition to the temperatures of the refrigerating evaporator 11 and the freezing evaporator 21 of an embodiment has been illustrated above, control may also be performed on the basis of the number of rotations of the compressor 30 in addition to the amount of time that has been elapsed from the start of simultaneous cooling of the refrigerating compartment 10 and the freezing compartment 20 of an embodiment.

Figure 20:
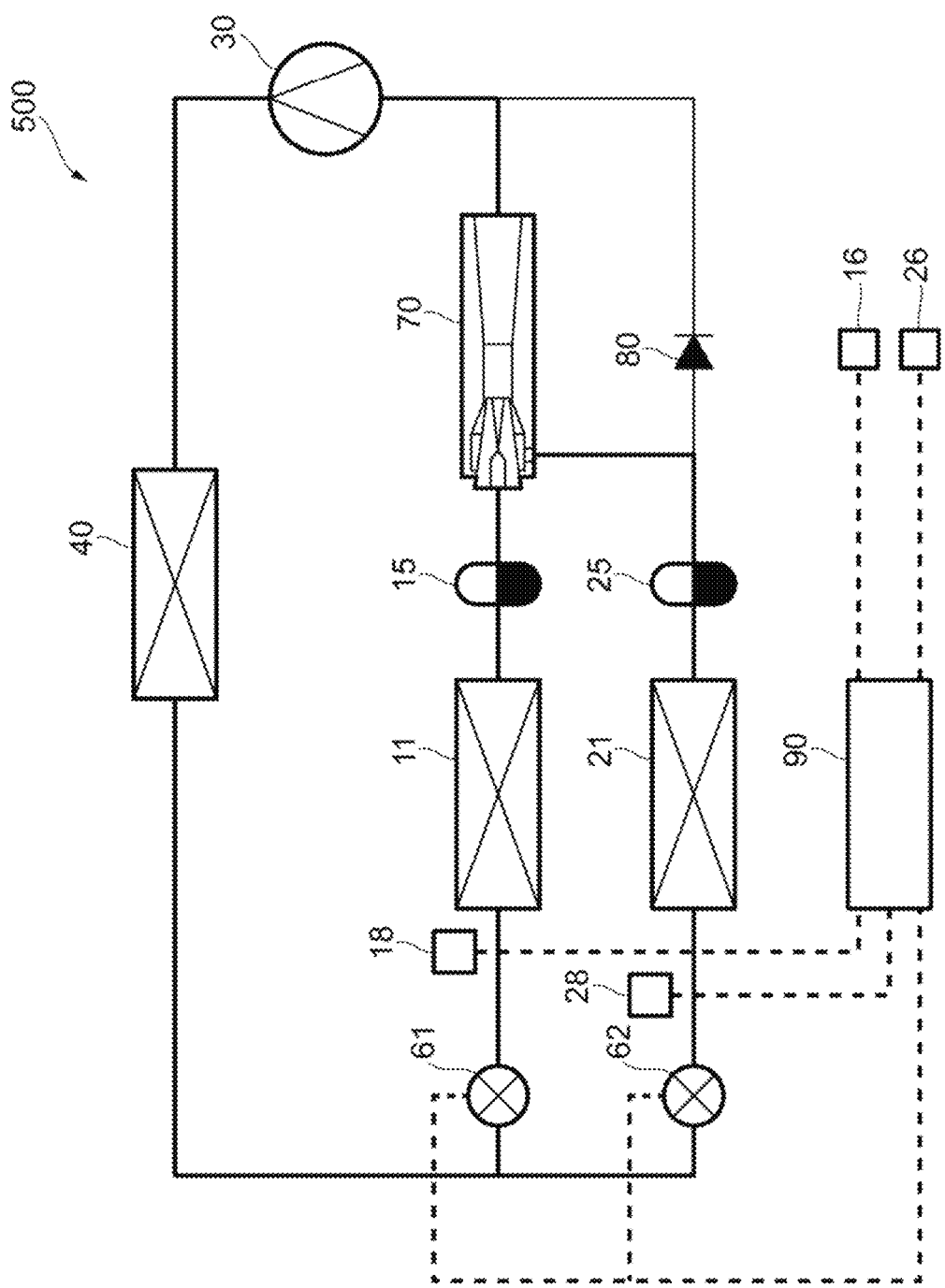
FIG. 20 is a view illustrating a configuration example of a refrigeration cycle according to an embodiment of the present disclosure.

FIG. 20 is a view illustrating configuration of a refrigeration cycle 500, which is an example of a refrigeration cycle according to an embodiment. As illustrated in FIG. 20, the refrigeration cycle 500 has the same configuration as the refrigeration cycle 200 of FIG. 3A except that a refrigerating evaporator temperature sensor 18 configured to measure temperature of an inlet of the refrigerating evaporator 11 is installed in the vicinity of the inlet of the refrigerating evaporator 11, which is an example of a first cooler, a freezing evaporator temperature sensor 28 configured to measure temperature of an inlet of the freezing evaporator 21 is installed in the vicinity of the inlet of the freezing evaporator 21, which is an example of a second cooler, an expansion valve 61 is installed at the refrigerating evaporator 11 side instead of the three-way flow rate control valve 60, and an expansion valve 62 is installed at the freezing evaporator 21 side. However, the positions of the refrigerating evaporator temperature sensor 18 and the freezing evaporator temperature sensor 28 are merely examples, and the refrigerating evaporator temperature sensor 18 and the freezing evaporator temperature sensor 28 may also be installed in the vicinity of outlets of the refrigerating evaporator 11 and the freezing evaporator 21, respectively. The refrigerating evaporator temperature sensor 18 and the freezing evaporator temperature sensor 28 are examples of a temperature sensor. Since the expansion valves 61 and 62 may adjust throttle and flow rate in accordance with an opening degree step, flow rates at a driving side and a suctioning side of the ejector 70 are adjusted by a valve opening degree instead of time division. The expansion valves 61 and 62 are examples of a switcher.

Although a refrigerating capillary tube and a freezing capillary tube are not installed in the refrigeration cycle 500 of FIG. 20, the refrigerating capillary tube may be installed at a downstream side of the expansion valve 61, and the freezing capillary tube may be installed at a downstream side of the expansion valve 62.

Even in the configuration having the expansion valves 61 and 62 as in the refrigeration cycle 500 of FIG. 20, when opening degrees of the expansion valves 61 and 62 are fixed, mass flow rate ratios at the refrigerating evaporator 11 side and the freezing evaporator 21 side are changed in accordance with temperature changes of the refrigerating evaporator 11 and the freezing evaporator 21.

Therefore, in an embodiment, the opening degrees of the expansion valves 61 and 62 are varied, and the mass flow rate ratios at the refrigerating evaporator 11 side and the freezing evaporator 21 side are controlled to be constant.

Figure 21:
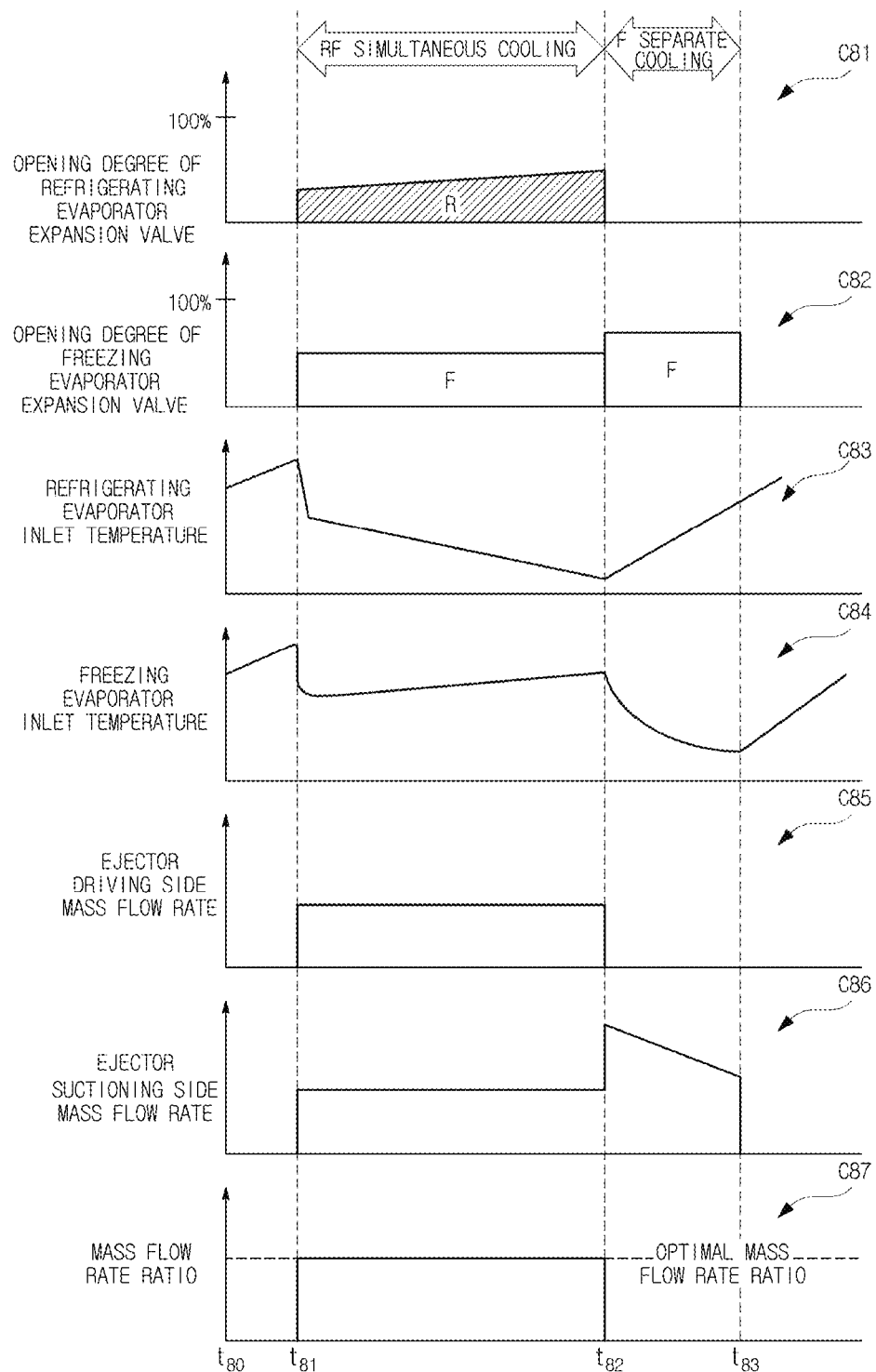
FIG. 21 is a time chart showing a control example of an expansion valve according to an embodiment of the present disclosure.

FIG. 21 is a time chart illustrating a control example of the expansion valves 61 and 62 according to an embodiment. A time chart C81 shows a trend of an opening degree of the expansion valve 61 at the refrigerating evaporator 11 side, a time chart C82 shows a trend of an opening degree of the expansion valve 62 at the freezing evaporator 21 side, a time chart C83 shows a trend of temperature of the inlet of the refrigerating evaporator 11, a time chart C84 shows a trend of temperature of the inlet of the freezing evaporator 21, a time chart C85 shows a trend of a mass flow rate at the driving side of the ejector 70, a time chart C86 shows a trend of a mass flow rate at the suctioning side of the ejector 70, and a time chart C87 shows a trend of a mass flow rate ratio.

Even during control of the expansion valves 61 and 62 according to an embodiment, since, as shown in t81 to t82 of the time chart C83, the temperature of the inlet of the refrigerating evaporator 11 is decreased, and accordingly a refrigerant density is decreased, a mass flow rate at the driving side of the ejector 70 is also decreased. Therefore, to make the mass flow rate constant, as shown in t81 to t82 of the time chart C81, the opening degree of the expansion valve 61 at the refrigerating evaporator 11 side is increased in accordance with a decrease of the temperature of the inlet of the refrigerating evaporator 11, and a decrease of the mass flow rate at the driving side of the ejector 70 is suppressed. Accordingly, as shown in t81 to t82 of the time chart C87, the mass flow rate ratio between the driving side and the suctioning side of the ejector 70 is controlled to be constant.

Even in this case, although an example has been illustrated of performing control on the temperature of the inlet of the refrigerating evaporator 11 of the time chart C83 and the temperature of the inlet of the freezing evaporator 21 of the time chart C84 based only on the temperature of the inlet of the refrigerating evaporator 11, embodiments are not limited thereto. The control may also be performed on the basis of both the temperature of the inlet of the refrigerating evaporator 11 and the temperature of the inlet of the freezing evaporator 21 or on the basis of only the temperature of the inlet of the freezing evaporator 21.

Also, although a control example in which the opening degree of the expansion valve 61 at the refrigerating evaporator 11 side is varied, and the opening degree of the expansion valve 62 at the freezing evaporator 21 side is fixed has been illustrated in FIG. 21, embodiments are not limited thereto. The opening degree of the expansion valve 62 at the freezing evaporator 21 side may be varied, or the opening degrees of both the expansion valve 61 at the refrigerating evaporator 11 side and the expansion valve 62 at the freezing evaporator 21 side may be varied.

Although the refrigerating compartment 10 and the freezing compartment 20 have been given as examples of two storage compartments configured to cool food or the like in two different temperature ranges in the present embodiment, embodiments are not limited thereto. For example, as the two storage compartments, two storage compartments configured to cool food or the like in two different temperature ranges within a temperature range of the refrigerating compartment 10, or two storage compartments configured to cool food or the like in two different temperature ranges within a temperature range of the freezing compartment 20 may also be used. Alternatively, two storage compartments configured to cool food or the like in temperature ranges that cannot be viewed as two different temperature ranges, i.e., that may be viewed as the same temperature ranges, may also be used.

Although it has been described above that the present embodiment is applied to the refrigerator 1, embodiments are not limited thereto. For example, the present embodiment may be applied to various other products that include two storage compartments configured to cool food or the like in two different temperature ranges, such as a freezing container and a freezing truck.

In the present embodiment, when, in a state in which two storage compartments are being cooled, cooling of one of the storage compartments is suppressed, a reduced amount of refrigerant is continuously circulated to a cooler configured to cool the one of the storage compartments instead of setting refrigerant, which is a driving flow of the ejector 70, circulated to the cooler as zero. Accordingly, a pressure rising effect of the ejector 70 may be maintained, and energy efficiency may be achieved.

Also, in the present embodiment, when, in a state in which two storage compartments are being cooled, cooling of one of the storage compartments is suppressed, a smaller amount of refrigerant is circulated to a cooler configured to cool the other storage compartment. Accordingly, the amount of refrigerant becoming excessive may be prevented, and energy efficiency is possible.

Further, in the present embodiment, when two storage compartments are being cooled, a ratio between a flow rate of refrigerant circulated along a flow path to a cooler configured to cool one of the storage compartments and a flow rate of refrigerant circulated along a flow path to a cooler configured to cool the other storage compartment is changed in accordance with a temperature of each cooler. Accordingly, a flow rate ratio between refrigerants flowing to the coolers may be optimized, and energy efficiency may be achieved.

Although the switching valve 50 flows refrigerant to one among the refrigerating evaporator 11 and the freezing evaporator 21 and controls a flow rate ratio of refrigerant by a time ratio of the refrigerant in various embodiments, refrigerant may also be circulated to both the refrigerating evaporator 11 and the freezing evaporator 21 and a flow rate ratio of refrigerant may be controlled to shorten a driving time of valve switching and achieve energy efficiency.

An embodiment relates to the switching valve 50 configured to perform such control of a flow rate ratio.

The switching valve 50 according to the present embodiment is for flowing refrigerant to one or both of the refrigerating evaporator 11 and the freezing evaporator 21, and as illustrated in FIGS. 2 and 11, the switching valve 50 is installed in the form of being connected to an outlet side of the condenser 40 and inlet sides of the capillary tubes 14 and 24.

The switching valve 50 of the present embodiment is a so-called three-way valve for flowing refrigerant introduced thereinto to one or both of the refrigerating evaporator 11 and the freezing evaporator 21, and is configured to adjust a flow rate of refrigerant being circulated to each of the refrigerating evaporator 11 and the freezing evaporator 21.

Figure 22:
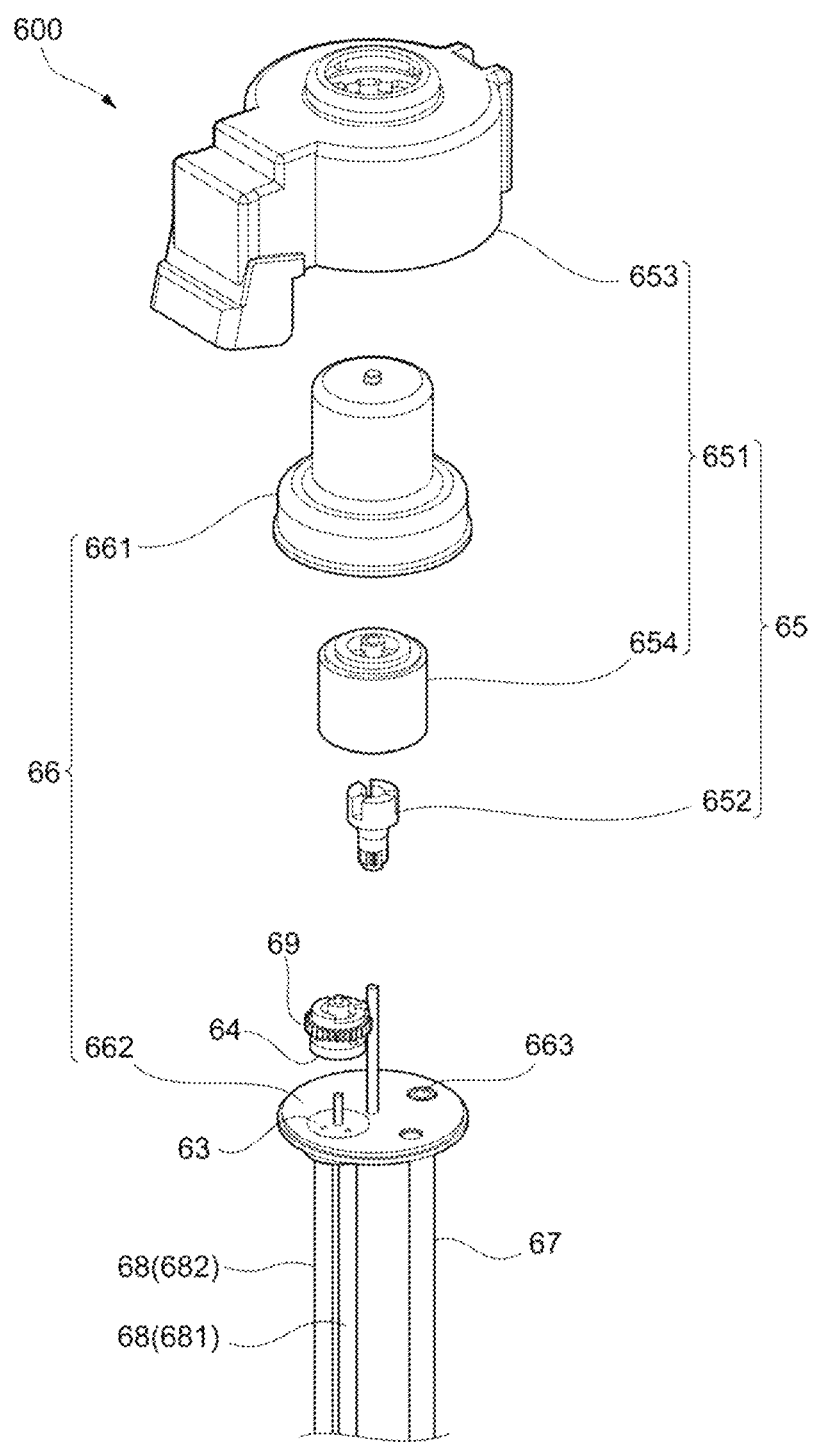
FIG. 22 is a schematic diagram illustrating an entire switching valve viewed from the top according to an embodiment of the present disclosure.
Figure 23:
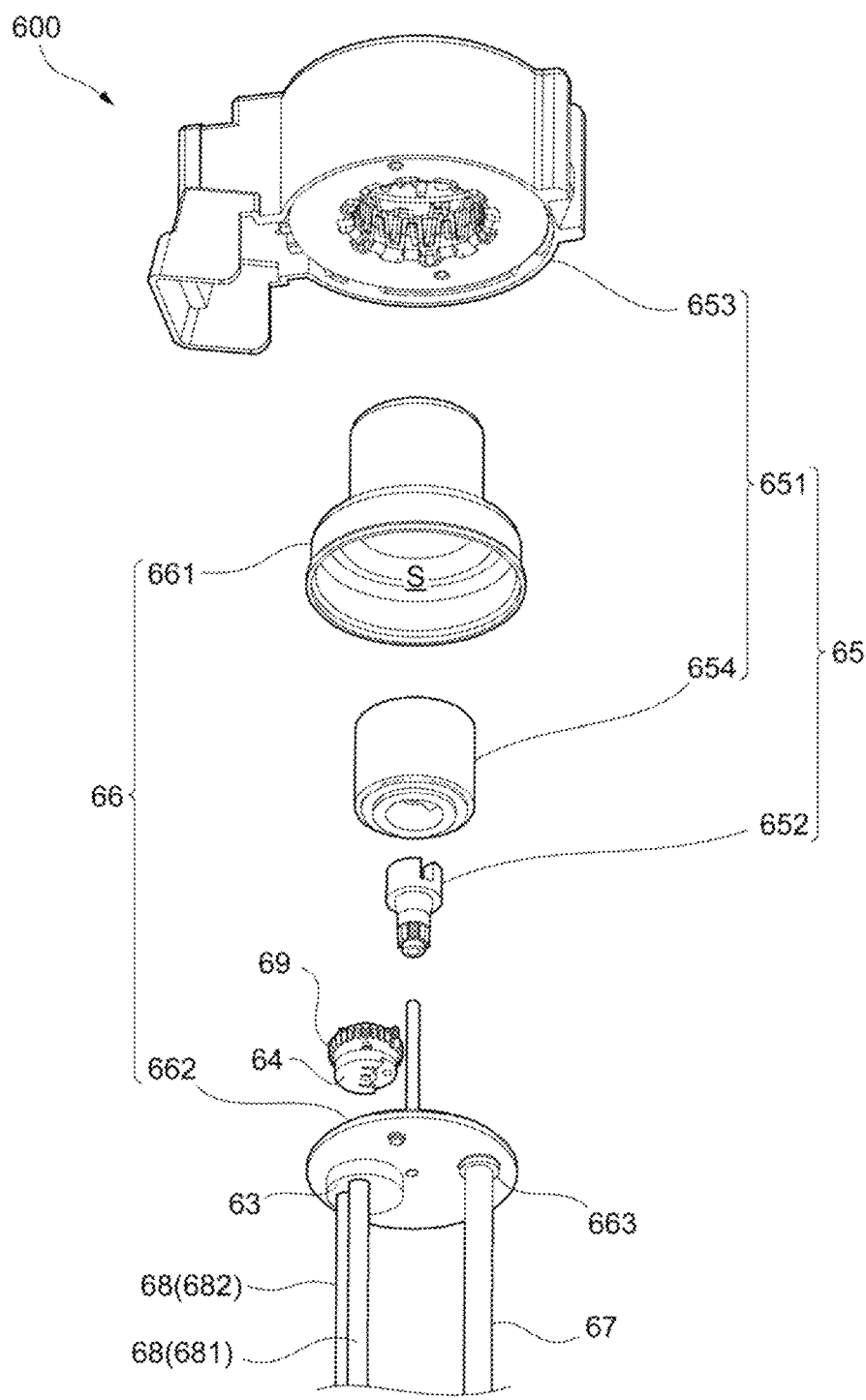
FIG. 23 is a schematic diagram illustrating the entire switching valve viewed from the bottom according to an embodiment of the present disclosure.
Figure 24:
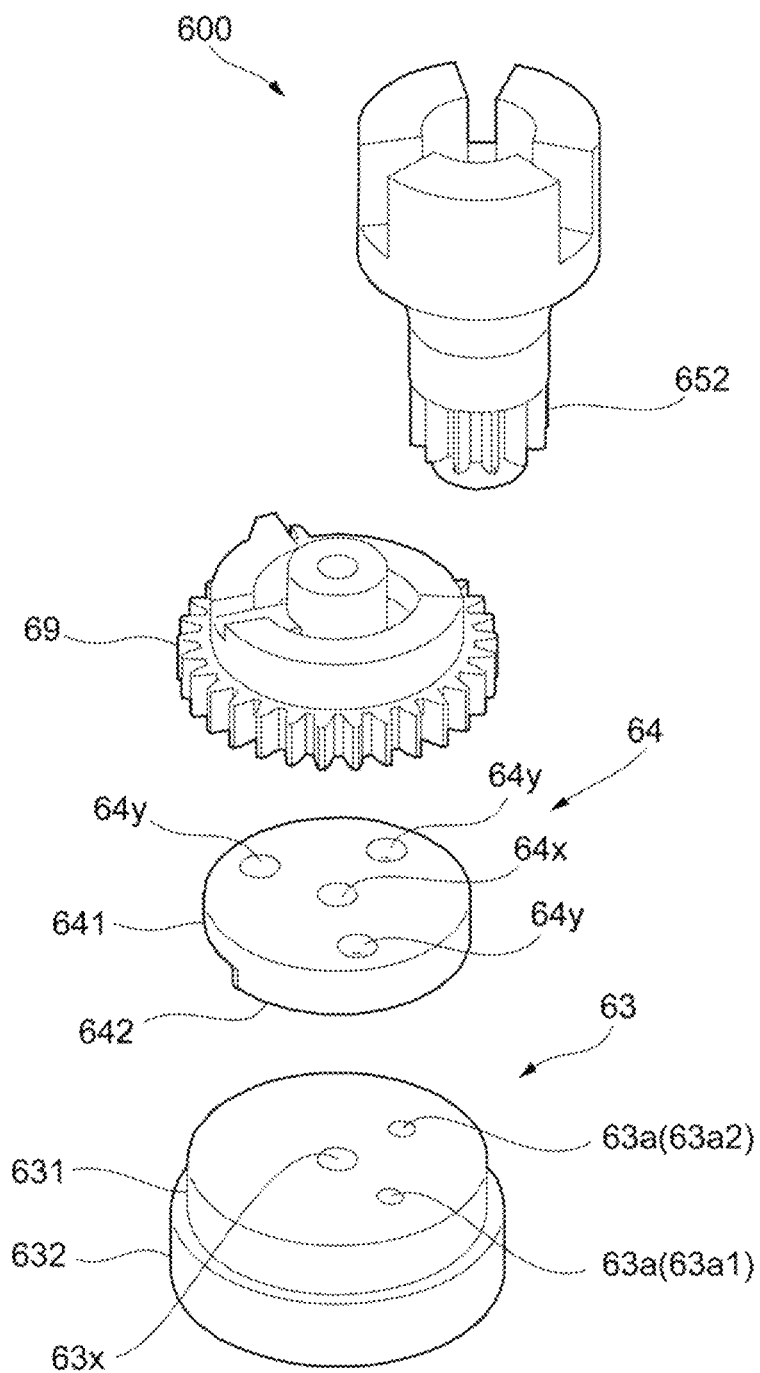
FIG. 24 is a schematic diagram illustrating a valve sheet and a valve member of the switching valve viewed from the top according to an embodiment of the present disclosure.
Figure 25:
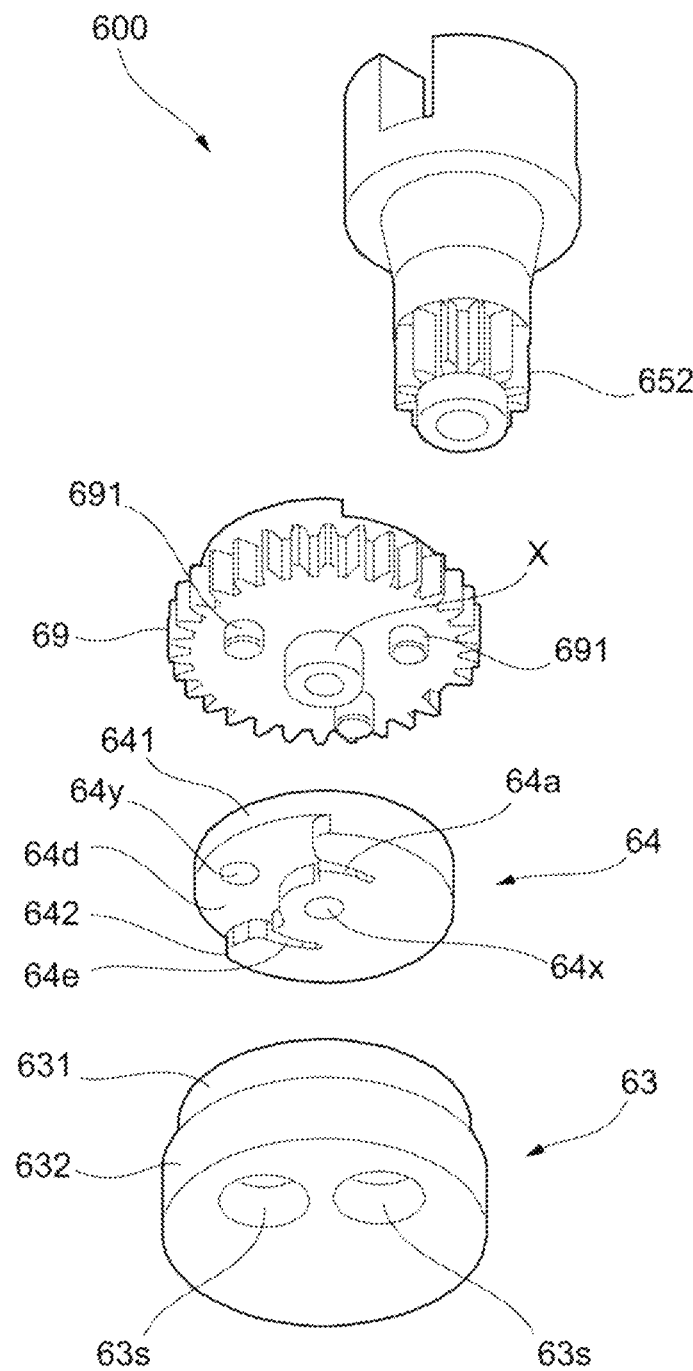
FIG. 25 is a schematic diagram illustrating the valve sheet and the valve member of the switching valve viewed from the bottom according to an embodiment of the present disclosure.

Specifically, as illustrated in FIGS. 22 and 23, a three-way flow rate control valve 600 corresponding to the switching valve 50 configured to control a flow rate of refrigerant while flowing the refrigerant to both of the refrigerating evaporator 11 and the freezing evaporator 21 includes at least a valve sheet 63 and a valve member 64, and in this case, further includes a driving mechanism 65 configured to rotate the valve member 64, and a casing 66 configured to hold the valve sheet 63 and the valve member 64 and having a refrigerant introduction space S into which refrigerant is introduced.

The driving mechanism 65 has a stator 653, a motor 651 having a rotor 654 installed inside the stator 653, and an output gear 652 configured to be interlocked with the rotor 654 and rotate to output driving force of the motor 651.

As illustrated in FIG. 23, the casing 66 has a hollow casing main body 661 having an opening formed at a bottom surface and a cover body 662 configured to close an opening and form the refrigerant introduction space S together with the casing main body 661.

The casing main body 661 has a shape of, for example, a rotator formed of metal or the like, and in this case, is disposed inside the stator 653 while holding the rotor 654 in the hollow thereof.

The cover body 662 has a flat plate shape, includes an inlet 663 configured to communicate with the refrigerant introduction space S and introduce refrigerant into the refrigerant introduction space S, and in this case, has a shape of a disk whose diameter size (diameter) is, for example, 35 mm or less. The inlet 663 is connected to an outlet side of the condenser 40 by an introduction pipe 67, and accordingly, refrigerant flowing out from the condenser 40 is circulated into the refrigerant introduction space S.

As illustrated in FIGS. 22 to 25, the valve sheet 63 is fitted without a gap to a through-hole formed in the above-described cover body 662, and includes an outlet 63a configured to communicate with the refrigerant introduction space S and discharge refrigerant from the refrigerant introduction space S. Also, a through-hole 63x into which a rotating shaft X of the valve member 64, which will be described below, is fitted is formed at the center of the valve sheet 63.

For the valve sheet 63 of the present embodiment to be easily attached to the cover body 662, an upper portion 631 of the valve sheet 63 has the same size as the through-hole formed in the cover body 662, and a lower portion 632 of the valve sheet 63 has a larger size than the upper portion 631, so that when the upper portion 631 is fitted into the through-hole in the cover body 662 from the bottom, an end formed between the upper portion 631 and the lower portion 632 comes into contact with a lower surface of the cover body 662.

Specifically, the valve sheet 63 has a shape of a disk whose diameter size (diameter) is 16 mm or less, and by penetrating through the upper portion 631 of the valve sheet 63 in a thickness direction, an outlet 63a having a diameter of, for example, 0.8 mm, is formed at an upper surface of the upper portion 631.

Also, a discharge pipe hole 63s configured to communicate with the outlet 63a and having a larger diameter size than the outlet 63a is formed in the lower portion 632, and a discharge pipe 68 is configured to be fitted into the discharge pipe hole 63s. The outlet 63a is connected to inlet sides of the refrigerating evaporator 11 and the freezing evaporator 21 by the discharge pipe 68 and refrigerant discharged from the refrigerant introduction space S via the outlet 63a is discharged to one or both of the refrigerating evaporator 11 and the freezing evaporator 21.

In the valve sheet 63 of the present embodiment, two outlets 63a (hereinafter, the outlets 63a will be referred to as a first outlet 63a1 and a second outlet 63a2) are formed. In the present embodiment, the first outlet 63a1 is connected to the inlet side of the refrigerating evaporator 11 by a first discharge pipe 681, and the second outlet 63a2 is connected to the inlet side of the freezing evaporator 21 by a second discharge pipe 682.

The first outlet 63a1 and the second outlet 63a2 have the same diameter size, and are disposed in a circumferential direction around the center of the valve sheet 63. That is, a distance from the center of the valve sheet 63 to the center of the first outlet 63a1 and a distance from the center of the valve sheet 63 to the center of the second outlet 63a2 are equal to each other.

The valve member 64 is installed to be rotatable with respect to the valve sheet 63, is for adjusting an opening degree of the outlet 63a between a fully-open state and a fully-closed state, and has a first flow rate control groove 64a, which is an example of a first opening-degree-varying groove whose area overlapping the outlet 63a is changed in accordance with rotation, and a second flow rate control groove 64e, which is an example of a second opening-degree-varying groove.

As illustrated in FIGS. 22 to 25, the valve member 64 is installed at an upper side of the valve sheet 63 and rotates about a central axis of the valve sheet 63. In this case, a through-hole 64x through which the rotating shaft X passes is formed in the valve member 64. A manual gear 69 that is engaged with the above-described output gear 652 is attached to the valve member 64, and the rotating shaft X is installed at the manual gear 69. In more detail, a plurality of convex portions 691 are formed at the manual gear 69, and a plurality of concave portions 64y coupled to the convex portions 691 are formed at an upper surface of the valve member 64. Accordingly, by fitting the rotating shaft X into the through-hole 64x and coupling the convex portions 691 to the concave portions 64y, the valve member 64 is interlocked with the manual gear 69 and is rotated by the driving force of the driving mechanism 65.

The valve member 64 of the present embodiment is configured of a flat-plate-shaped upper portion 641 and a flat-plate-shaped lower portion 642 having the above-described first flow rate control groove 64a and the second flow rate control groove 64e formed by penetrating in the thickness direction. The upper portion 641 has, for example, a shape of a disk that entirely overlaps the lower portion 642, and the lower portion 642 has the first flow rate control groove 64a and the second flow rate control groove 64e formed on the disk. The valve member 64 of the present embodiment has a shape of a disk whose diameter size is, for example, 12 mm or less, and the first flow rate control groove 64a and the second flow rate control groove 64e are formed to extend in the circumferential direction.

Figure 26:
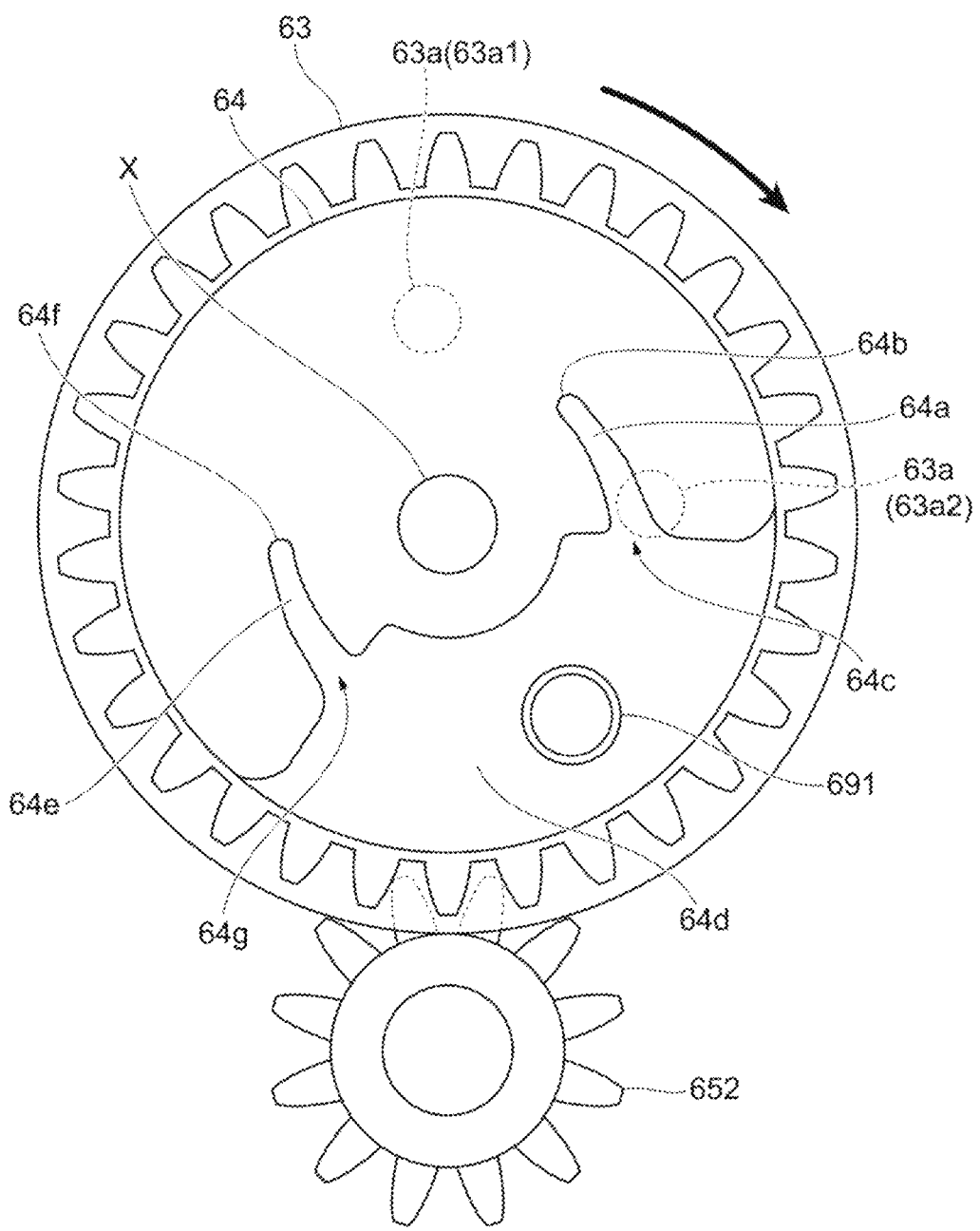
FIG. 26 is a plan view illustrating the valve sheet and the valve member of the switching valve according to an embodiment of the present disclosure.

As illustrated in FIG. 26, the first flow rate control groove 64a is formed so that a width size thereof is changed in the circumferential direction. In this case, the first flow rate control groove 64a is formed so that a width size is gradually decreased from a rear end 64c, at which the first flow rate control groove 64a begins to overlap the outlet 63a due to rotation of the valve member 64, toward a front end 64b at the opposite side.

As illustrated in FIG. 26, the second flow rate control groove 64e is also formed so that a width size thereof is changed in the circumferential direction. However, in this case, unlike the first flow rate control groove 64a, the second flow rate control groove 64e is formed so that a width size is gradually increased from a front end 64f, at which the second flow rate control groove 64e begins to overlap the outlet 63a due to rotation of the valve member 64 toward a rear end 64g at the opposite side.

Further, as illustrated in FIG. 26, a fully-open groove 64d, which is an example of a fully-open groove that is continuously formed with the rear end 64c and the rear end 64g and entirely overlaps the outlet 63a, is formed between the rear end 64c side of the first flow rate control groove 64a and the rear end 64g side of the second flow rate control groove 64e. The fully-open groove 64d is formed by cutting the lower portion 642 of the valve member 64 in the circumferential direction from the rear end 64c in a rotating direction of the valve member 64 and from the rear end 64g in a direction opposite to the rotating direction of the valve member 64.

Next, operation of the three-way flow rate control valve 600 and a refrigerant flow will be described.

Figure 27:
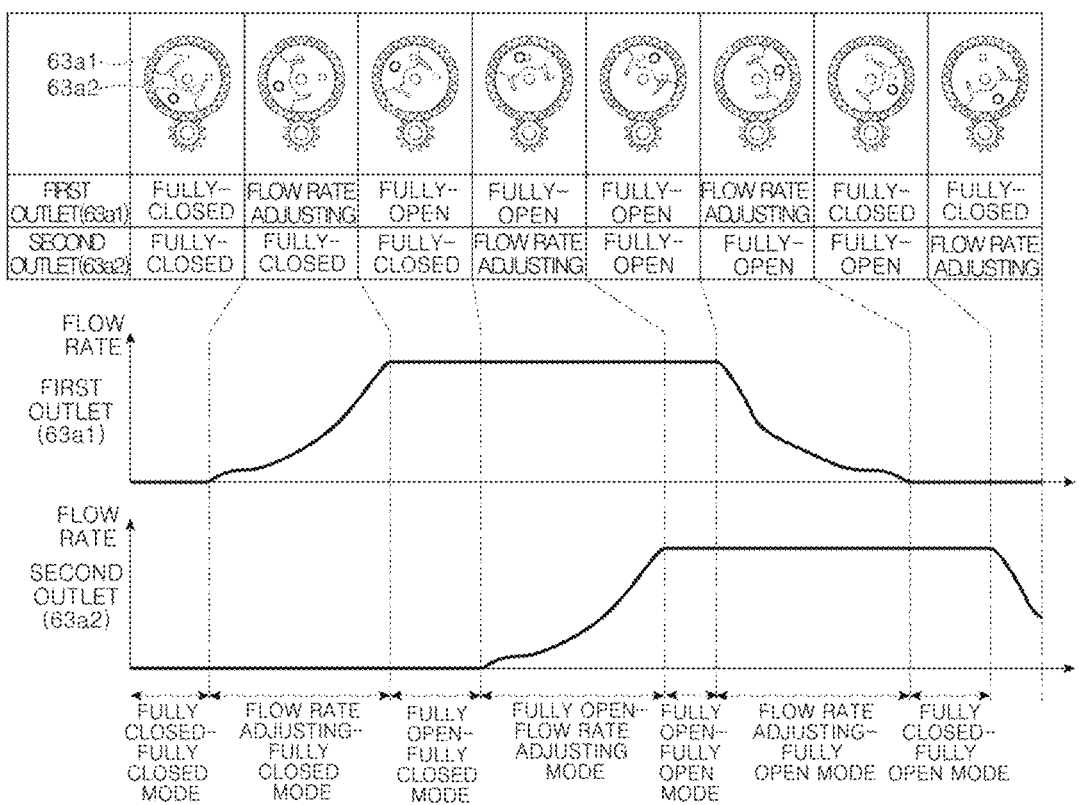
FIG. 27 is a view illustrating operation of the switching valve and a refrigerant flow according to an embodiment of the present disclosure.

As illustrated in FIG. 27, the three-way flow rate control valve 600 of the present embodiment is configured so that, by rotation of the valve member 64, in addition to a fully open-fully open mode, a fully closed-fully closed mode, a fully open-fully closed mode, and a fully closed-fully open mode, a flow rate adjusting—fully open mode, a fully open-flow rate adjusting mode, and a flow rate adjusting-fully closed mode are set in accordance with an angle of rotation of the valve member 64.

The fully open-fully open mode is a mode in which the first outlet 63a1 and the second outlet 63a2 simultaneously become fully-open regions, in other words, a mode in which the fully-open groove 64d entirely overlaps both the first outlet 63a1 and the second outlet 63a2. The fully open-fully open mode is an example of a fully-open state.

The fully closed-fully closed mode is a mode in which the first outlet 63a1 and the second outlet 63a2 simultaneously become fully-closed regions, in other words, a mode in which none of the fully-open groove 64d, the first flow rate control groove 64a, and the second flow rate control groove 64e overlap the first outlet 63a1 or the second outlet 63a2. The fully closed-fully closed mode is an example of a fully-closed state.

The fully open-fully closed mode is a mode in which the first outlet 63a1 becomes a fully-open region and the second outlet 63a2 becomes a fully-closed region, in other words, a mode in which the fully-open groove 64d entirely overlaps the first outlet 63a1, and none of the fully-open groove 64d, the first flow rate control groove 64a, and the second flow rate control groove 64e overlap the second outlet 63a2.

The fully closed-fully open mode is a mode in which the first outlet 63a1 becomes a fully-closed region and the second outlet 63a2 becomes a fully-open region, in other words, a mode in which the fully-open groove 64d entirely overlaps the second outlet 63a2, and none of the fully-open groove 64d, the first flow rate control groove 64a, and the second flow rate control groove 64e overlap the first outlet 63a1.

The flow rate adjusting-fully open mode is a mode in which a refrigerant flow rate ratio may be adjusted when a flow rate of refrigerant being discharged from the second outlet 63a2 is larger than a flow rate of refrigerant being discharged from the first outlet 63a1, in other words, a mode in which the fully-open groove 64d entirely overlaps the second outlet 63a2 while the first flow rate control groove 64a overlaps the first outlet 63a1. The flow rate adjusting-fully open mode is an example of a first flow rate ratio control state.

The fully open-flow rate adjusting mode is a mode in which a refrigerant flow rate ratio may be adjusted when a flow rate of refrigerant being discharged from the first outlet 63a1 is larger than a flow rate of refrigerant being discharged from the second outlet 63a2, in other words, a mode in which the fully-open groove 64d entirely overlaps the first outlet 63a1 while the second flow rate control groove 64e overlaps the second outlet 63a2. The fully open-flow rate adjusting mode is an example of a second flow rate ratio control state.

The flow rate adjusting-fully closed mode is a mode in which a flow rate of refrigerant being discharged from the first outlet 63a1 may be separately adjusted, in other words, a mode in which, while the second flow rate control groove 64e overlaps the first outlet 63a1, none of the fully-open groove 64d, the first flow rate control groove 64a, and the second flow rate control groove 64e overlap the second outlet 63a2. The flow rate adjusting-fully closed mode is an example of a first individual flow rate control state.

A flow rate of refrigerant being discharged from the first outlet 63a1 in the flow rate adjusting-fully open mode and a flow rate of refrigerant being discharged from the second outlet 63a2 in the fully open-flow rate adjusting mode are configured to be gradually increased or decreased between a flow rate at a fully-open state and a flow rate at a fully-closed state. Also, a flow rate of refrigerant being discharged from the first outlet 63a1 in the flow rate adjusting-fully closed mode is configured to be gradually increased from a flow rate at the fully-closed state to a flow rate at the fully-open state. Although a flow rate of refrigerant being discharged from the second outlet 63a2 in a subsequent mode of the fully open-fully open mode in FIG. 27 is gradually decreased from the flow rate at the fully-open state, since the flow rate does not reach the flow rate at the fully-closed state, the mode is not referred to as the fully closed-flow rate adjusting mode. As in the fourth an embodiment, the refrigeration cycle that does not flow refrigerant to the refrigerating evaporator 11 and adjusts only a flow rate of refrigerant being circulated to the freezing evaporator 21 connected to the first outlet 63a1 to the freezing evaporator 21 and connects the second outlet 63a2 to the refrigerating evaporator 11, so that the refrigeration cycle may be realized even without the fully closed-flow rate adjusting mode as long as there is a flow rate adjusting-fully closed mode.

However, a flow rate of refrigerant being discharged from the second outlet 63a2 in a subsequent mode of the fully closed-fully open mode of FIG. 27 may be gradually decreased from the flow rate at the fully-open state to reach the flow rate at the fully-closed state, and this may be referred to as the fully closed-flow rate adjusting mode. In this case, the fully closed-flow rate adjusting mode is an example of a second individual flow rate control state. For example, when a range of rotation of the valve member 64 is limited by a stopper (not illustrated) in FIG. 27, the fully closed-flow rate adjusting mode may be realized by eliminating the limit and widening the range of rotation of the valve member 64.

Although the three-way flow rate control valve 600 of the present embodiment is configured so that the fully open-fully open mode, the fully closed-fully closed mode, the fully open-fully closed mode, the fully closed-fully open mode, the flow rate adjusting-fully open mode, the fully open-flow rate adjusting mode, and the flow rate adjusting-fully closed mode are set, embodiments are not limited thereto.

First, being configured so that at least the flow rate adjusting-fully open mode and the fully open-flow rate adjusting mode are set is taken into consideration. In this case, instead of the first flow rate control groove 64a and the second flow rate control groove 64e being formed as described above, only a single flow rate control groove may be formed. For example, the first outlet 63a1 and the second outlet 63a2 may be formed at opposite positions with the rotating shaft X of the valve sheet 63 disposed therebetween, and a flow rate control groove and a fully-open groove 64d may be formed at opposite positions with the rotating shaft X of the valve member 64 disposed therebetween.

In addition, being configured so that at least the fully open-fully open mode is set is taken into consideration. In this case, in FIG. 27, for example, a boundary portion between the first flow rate control groove 64a and the fully-open groove 64d may be moved counterclockwise, and the fully-open groove 64d may be widened.

In addition, being configured so that at least the fully closed-fully closed mode is set is taken into consideration. In this case, in FIG. 27, for example, a boundary portion between the first flow rate control groove 64a and the fully-open groove 64d may be moved clockwise, and the fully-open groove 64d may be narrowed.

Further, in the present embodiment, although the three-way flow rate control valve 600 corresponding to the switching valve 50 in various embodiments has been described, a mode configuration of FIG. 27 may be slightly changed, and the present embodiment may also be applied to a three-way flow rate control valve 600 to which the expansion valves 61 and 62 according to an embodiment are integrated.

In the present embodiment, a fully open-flow rate adjusting mode in which the first outlet 63a1 is a fully-open region and the second outlet 63a2 is a flow rate adjusting region, and a flow rate adjusting-fully open mode in which the second outlet 63a2 is a fully-open region and the first outlet 63a1 is a flow rate adjusting region are set. Accordingly, with respect to a method in which a flow rate ratio of refrigerant is controlled with a time ratio by alternately switching opening and closing of the refrigerating evaporator 11 and the freezing evaporator 21 with the switching valve 50 of FIG. 2 or the three-way flow rate control valve 60 of FIG. 3A, a valve is moved within the range from the fully open-flow rate adjusting mode to the flow rate adjusting-fully open mode so that driving time is shortened, and energy efficiency is achieved. Also, even when there is deviation due to tolerance in processing or assembling a flow rate control groove, a ratio of refrigerant flow rate between the first outlet 63a1 and the second outlet 63a2 may be adjusted within a wide range.

In the present embodiment, a flow rate adjusting-fully closed mode or a fully open-fully closed mode in which the first outlet 63a1 is a flow rate adjusting region or a fully-open region and the second outlet 63a2 is a fully-closed region, and a fully closed-fully open mode in which the second outlet 63a2 is a fully-open region and the first outlet 63a1 is a fully-closed region are set. Further, it has also been described that a fully closed-flow rate adjusting mode in which the second outlet 63a2 is a flow rate adjusting region and the first outlet 63a1 is a fully-closed region may be set. Accordingly, refrigerant flow rates of the first outlet 63a1 and the second outlet 63a2 may also be separately controlled.

The embodiments disclosed herein may be implemented in the form of a recording medium that stores computer-executable instructions. The instructions may be stored in the form of program codes, and when a processor is executed, a program module may be generated and perform operations of the embodiments disclosed herein. The recording medium may be implemented with a computer-readable recording medium.

The computer-readable recording medium includes all types of recording media in which computer-readable instructions are stored. For example, the computer-readable recording medium may include a read-only memory (ROM), a random access memory (RAM), a magnetic tape, a magnetic disk, a flash memory, an optical data storage, and the like.

As is apparent from the above description, according to the present disclosure, when, in a state in which two storage compartments are being cooled, cooling of one of the storage compartments is suppressed, the case in which an effect of a mixer cannot be maintained due to a refrigerant mixed in the mixer not being circulated to a cooler configured to cool at least the one of the storage compartments at all, or the case in which the amount of refrigerant becomes excessive due to entire refrigerant being circulated to a cooler configured to cool at least the other storage compartment can be prevented, thereby achieving energy efficiency.

According to the present disclosure, when, in a state in which two storage compartments are being cooled, the case in which an effect of a mixer cannot be demonstrated due to a ratio between a flow rate of refrigerant flowing to a cooler configured to cool at least one of the storage compartments and a flow rate of refrigerant flowing to a cooler configured to cool at least the other storage compartment being changed in accordance with a temperature change during cooling can be prevented, thereby achieving energy efficiency.

Although the present disclosure has been described with various embodiments, various changes and modifications may be suggested to one skilled in the art. It is intended that the present disclosure encompass such changes and modifications as fall within the scope of the appended claims.

What is claimed is:

1. A refrigerator comprising:
a compressor configured to circulate a refrigerant;
a first cooler configured to cool at least a first storage compartment with the refrigerant circulated by the compressor;
a second cooler configured to cool at least a second storage compartment with the refrigerant circulated by the compressor;
a mixer configured to:
  mix a refrigerant that has passed through the first cooler and a refrigerant that has passed through the second cooler, and
  supply the mixed refrigerant to the compressor;
a switcher configured to switch a refrigerant flow path to control a refrigerant flow rate of the first cooler and the second cooler when cooling the first storage compartment or the second storage compartment; and a first heat exchanger configured to perform a heat exchange between (i) a high-temperature refrigerant that has passed through a condenser configured to condense the refrigerant circulated by the compressor and (ii) a low-temperature refrigerant that has passed through the first cooler but has not yet passed through the mixer; or
a second heat exchanger configured to perform a heat exchange between (i) a high-temperature refrigerant that has passed through a condenser configured to condense the refrigerant circulated by the compressor and (ii) a low-temperature refrigerant that has passed through the second cooler but has not yet passed through the mixer.

2. The refrigerator of claim 1, wherein the mixer is an ejector configured to:
set the refrigerant that has passed through the first cooler as a driving flow,
set the refrigerant that has passed through the second cooler as a suction flow, and
mix the driving flow and the suction flow, and
supply the mixed flow to the compressor.

3. The refrigerator of claim 1, wherein the switcher includes an opening degree adjusting mechanism configured to throttle and expand an amount of refrigerant circulated by the compressor.

4. The refrigerator of claim 1, wherein the switcher is configured to switch the refrigerant flow path so that, while the first storage compartment and the second storage compartment are being cooled, a refrigerant is circulated to the first cooler for a part of a predetermined switching time period proportional to a first flow rate and the second cooler for a part of the predetermined switching time period proportional to a second flow rate with a time ratio in accordance with a flow rate ratio between a first flow rate and a second flow rate.

5. The refrigerator of claim 1, wherein the switcher is configured to:
switch the refrigerant flow path to flow a refrigerant of a first flow rate to the first cooler and a refrigerant of a second flow rate to the second cooler while the first storage compartment and the second storage compartment are being cooled, and
switch the refrigerant flow path to circulate a refrigerant of a preset flow rate to the first cooler when cooling of the first storage compartment is completed.

6. The refrigerator of claim 5, wherein the switcher is configured to be controlled with time, by a temperature sensor in the first storage compartment, or a temperature sensor in the second storage compartment.

7. The refrigerator of claim 5, wherein the switcher is configured to decrease an amount of refrigerant being circulated to the second cooler to allow a refrigeration capacity of the first cooler to be higher than a refrigeration capacity of the second cooler and prevent the second flow rate from causing a temperature of the second storage compartment to increase while the first storage compartment is being cooled.

8. The refrigerator of claim 1, further comprising a temperature sensor configured to sense a temperature of at least one of the first cooler or the second cooler,
wherein the switcher is configured to switch the refrigerant flow path so that a ratio between a flow rate of refrigerant circulated along a flow path to the first cooler and a flow rate of refrigerant circulated along a flow path to the second cooler is changed in accordance with the temperature sensed by the temperature sensor while the first storage compartment and the second storage compartment are being cooled.

9. The refrigerator of claim 8, wherein the switcher is configured to switch the refrigerant flow path so that a ratio between a flow rate of refrigerant circulated to a flow path to the first cooler and a flow rate of refrigerant circulated to a flow path to the second cooler is changed in accordance with a number of rotations of the compressor while the first storage compartment and the second storage compartment are being cooled.

10. The refrigerator of claim 8, wherein the switcher is configured to change the ratio between the flow rate of refrigerant circulated along the flow path to the first cooler and the flow rate of refrigerant circulated along the flow path to the second cooler so that a ratio between the flow rate of refrigerant flowing to the first cooler and the flow rate of refrigerant flowing to the second cooler maintains a constant ratio.

11. The refrigerator of claim 1, wherein the switcher is configured to switch the refrigerant flow path so that a ratio between a flow rate of refrigerant circulated to a flow path to the first cooler and a flow rate of refrigerant circulated to a flow path to the second cooler is changed in accordance with elapsed time after cooling is started while the first storage compartment and the second storage compartment are being cooled.

12. The refrigerator of claim 11, wherein the switcher is configured to switch the refrigerant flow path so that the ratio between the flow rate of refrigerant circulated along the flow path to the first cooler and the flow rate of refrigerant circulated along the flow path to the second cooler is changed in accordance with a number of rotations of the compressor while the first storage compartment and the second storage compartment are being cooled.

13. The refrigerator of claim 11, wherein the switcher is configured to change the ratio between the flow rate of refrigerant circulated along the flow path to the first cooler and the flow rate of refrigerant circulated along the flow path to the second cooler is changed so that the ratio between the flow rate of refrigerant flowing to the first cooler and the flow rate of refrigerant flowing to the second cooler maintains a constant ratio.

14. The refrigerator of claim 1, wherein the switcher is configured to determine a first flow rate of the first cooler and a second flow rate of the second cooler based on a difference between actual temperatures and target temperatures of the first storage compartment and the second storage compartment.

15. The refrigerator of claim 1, wherein the switcher is configured to switch the refrigerant flow path to circulate a refrigerant of a first flow rate to the first cooler and a refrigerant of a second flow rate to the second cooler while the first storage compartment and the second storage compartment are being cooled and switches a refrigerant flow path to circulate a refrigerant of a preset flow rate only to the second cooler when cooling of the first storage compartment is completed.

16. The refrigerator of claim 15, wherein, when cooling of the first storage compartment is completed, the switcher is configured to circulate the refrigerant only to the second cooler for a time corresponding to a specific flow rate.

17. The refrigerator of claim 15, wherein the switcher is configured to be controlled with time, by a temperature sensor in the first storage compartment, or a temperature sensor in the second storage compartment.

18. The refrigerator of claim 15, wherein the switcher is configured to decrease an amount of refrigerant being circulated to the second cooler to allow a refrigeration capacity of the first cooler to be higher than a refrigeration capacity of the second cooler and prevent the second flow rate from causing a temperature of the second storage compartment to increase while the first storage compartment is being cooled.

19. The refrigerator of claim 1, wherein the switcher is configured to be controlled with time, by a temperature sensor in the first storage compartment, or a temperature sensor in the second storage compartment.

20. The refrigerator of claim 1, wherein the switcher, based on a predetermined switching time period, is further configured to:
switch a refrigerant flow path to control a refrigerant flow rate of the first cooler for part of the predetermined switching time period when cooling the first storage compartment; and
switch the refrigerant flow path to control a refrigerant flow rate of the second cooler for a remainder of the predetermined switching time period when cooling the second storage compartment.

* * * * *